(12) United States Patent
Saito et al.

(10) Patent No.: US 8,539,858 B2
(45) Date of Patent: Sep. 24, 2013

(54) ACCELERATOR DEVICE

(75) Inventors: Takehiro Saito, Kariya (JP); Haruhiko Suzuki, Anjo (JP); Masahiro Makino, Kariya (JP); Yoshinori Inuzuka, Okazaki (JP); Tetsuo Hariu, Hekinan (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 13/456,527

(22) Filed: Apr. 26, 2012

(65) Prior Publication Data

US 2012/0297920 A1    Nov. 29, 2012

(30) Foreign Application Priority Data

May 25, 2011   (JP) ................................. 2011-116983
Jul. 26, 2011   (JP) ................................. 2011-163089

(51) Int. Cl.
*G05G 1/14*    (2006.01)

(52) U.S. Cl.
USPC .................... 74/513; 74/512; 74/514; 74/560

(58) Field of Classification Search
USPC .............. 74/512–514, 518, 560; 200/61.89, 200/86.5
IPC .............................................. G05G 5/03, 1/14
See application file for complete search history.

(56) References Cited

U.S. PATENT DOCUMENTS

| | | | | |
|---|---|---|---|---|
| 5,138,899 A * | 8/1992 | Katagiri | ........................ | 74/512 |
| 5,215,341 A * | 6/1993 | Namakura et al. | ............ | 285/423 |
| 6,164,155 A * | 12/2000 | Tonissen et al. | ................ | 74/514 |
| 6,470,768 B2 * | 10/2002 | Kato et al. | ....................... | 74/513 |
| 6,951,152 B2 * | 10/2005 | Strole | ............................. | 74/512 |
| 7,246,598 B2 * | 7/2007 | Meguro | ........................ | 123/399 |
| 7,954,589 B2 * | 6/2011 | Sand et al. | .................... | 180/274 |
| 2003/0217614 A1 * | 11/2003 | Hauschopp et al. | ............ | 74/512 |
| 2005/0039564 A1 * | 2/2005 | Ouyang et al. | ................... | 74/514 |
| 2006/0179971 A1 * | 8/2006 | Peniston et al. | ................ | 74/560 |
| 2007/0000345 A1 * | 1/2007 | Leone | ............................. | 74/513 |
| 2007/0240534 A1 * | 10/2007 | Makino | .......................... | 74/513 |
| 2008/0276749 A1 * | 11/2008 | Stewart et al. | ................... | 74/512 |
| 2009/0183589 A1 * | 7/2009 | Watanabe et al. | ............... | 74/513 |

FOREIGN PATENT DOCUMENTS

JP    2010-158992    7/2010

* cited by examiner

*Primary Examiner* — Richard W Ridley
*Assistant Examiner* — William Santosa
(74) *Attorney, Agent, or Firm* — Nixon & Vanderhye PC

(57) ABSTRACT

An accelerator pedal rotates a pedal rotor when depressed. Rotors located on both sides of the pedal rotor are relatively rotatable to the pedal rotor. Second helical teeth of the rotors project toward the pedal rotor and engage with first helical teeth of the pedal rotor to bias the rotors when the pedal rotor rotates in the accelerator opening direction. The pedal rotor is rotatable to an accelerator full-close position without interfering with the first helical teeth when the pedal rotor rotates in an accelerator closing direction. A first biasing unit biases the rotors in the accelerator closing direction. A second biasing unit biases the accelerator pedal or the pedal rotor in the accelerator closing direction.

9 Claims, 25 Drawing Sheets

FIG. 7A
FIG. 7B
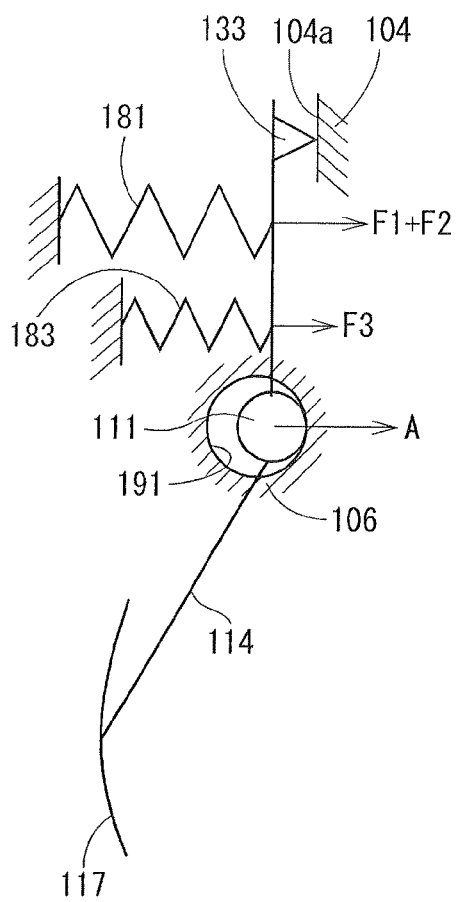
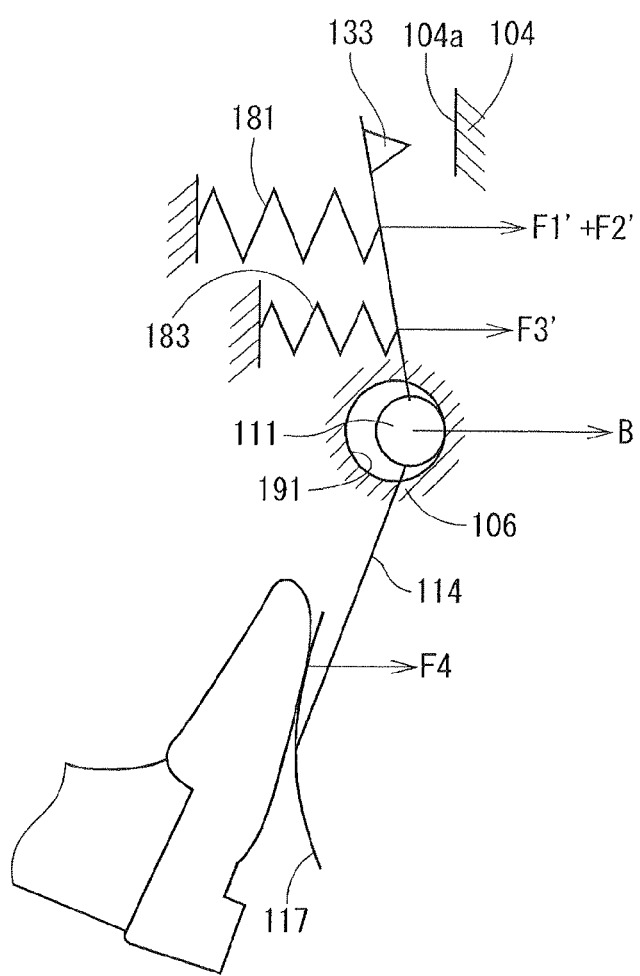

ACCELERATOR DEVICE

CROSS REFERENCE TO RELATED APPLICATIONS

This application is based on reference Japanese Patent Applications No. 2011-116983 filed on May 25, 2011 and No. 2011-163089 filed on Jul. 26, 2011, the disclosure of which is incorporated herein by reference.

TECHNICAL FIELD

The present invention relates to an accelerator device.

BACKGROUND

Conventionally, a throttle valve is equipped in a passage to control air drawn therethrough into an internal combustion engine of a vehicle. The throttle valve is operated according to a depression quantity of an accelerator pedal. An accelerator device is provided with such an accelerator pedal manipulated by an operator to determine an opening quantity of the throttle valve. The accelerator pedal is rotatably supported by a support member affixed to a vehicle body and is biased by a biasing component, such as a spring, toward an accelerator full-close position.

Such an accelerator device is categorized into a mechanical-type device and an electrical-type device. The mechanical-type accelerator device transmits a depression force (tread force) working on the accelerator pedal to the throttle valve via a transmission component such as a wire. The electric-type accelerator device includes a sensor for detecting the depression quantity of the accelerator pedal and transmits an electronic control unit an electric signal representing information about the depression quantity. The electronic control unit causes a throttle actuator to drive the throttle valve according to the information about the depression quantity and the like.

In a generally-known accelerator device with a tread force hysteresis characteristics, a tread force when depression of an accelerator pedal is released is less than a tread force when the accelerator pedal is depressed. In such a configuration, tread force is small when the depression of the accelerator pedal is maintained at a desired position or when the depression of the accelerator pedal is released. Therefore, burden of an operator when manipulating an accelerator pedal can be reduced.

For example, an accelerator device disclosed in JP-A-2010-158992 includes a rotor rotatable with an accelerator pedal. In the configuration of JP-A-2010-158992, a first frictional plate is equipped between the accelerator pedal and a support member. The first frictional plate is fixed to the accelerator pedal. In addition, a second frictional plate is further equipped between the rotor and the support member. As the accelerator pedal and the rotor are rotated from an idle state in an accelerator opening direction, the accelerator pedal and the rotor are spaced from each other in the axial direction. The accelerator pedal and the first frictional plate generate a frictional force therebetween, and the rotor and the second frictional plate generate a frictional force therebetween, to maintain an accelerator position corresponding to the rotation angle of the accelerator pedal.

It is noted that, according to the accelerator device disclosed in JP-A-2010-158992, it is conceivable that foreign matter sticks between the support member and the first frictional plate or between the rotor and the second frictional plate. In addition, it is further conceivable that the first frictional plate and/or the second frictional plate adhere to the support member due to, for example, an environmental variation to result in increase in frictional force of the friction member. In such a case, the accelerator pedal may not return to a full-close position where its accelerator opening is zero. When the first frictional plate adheres to the support member, the accelerator pedal is immovable. Alternatively, when the second frictional plate adheres to the support member, the rotor is immovable. In this case, the accelerator pedal is rotatable only within a clearance between a claw of the rotor and a claw of the accelerator pedal in the circumferential direction. Nevertheless, in the configuration of JP-A-2010-158992, the accelerator pedal is not enabled to return to the full-close position irrespective of the stop position of the rotor. Therefore, the accelerator pedal may not be returned to cause an idle state when depression of the accelerator pedal is released.

SUMMARY

It is an object of the present disclosure to produce an accelerator device including an accelerator pedal, which is enabled to return to an accelerator full-close position, irrespective of a rotational position of a rotor when depression of the accelerator pedal is released.

According to an aspect of the present disclosure, an accelerator device comprises a support member configured to be affixed to a vehicle body. The accelerator device further comprises a first shaft rotatably supported by the support member. The accelerator device further comprises an accelerator pedal integrated with the first shaft and configured to rotate the first shaft according to a quantity of depression on the accelerator pedal. The accelerator device further comprises a rotation angle detection unit configured to detect a relative rotation angle of the first shaft to the support member. The accelerator device further comprises a pedal rotor integrated with the first shaft. The accelerator device further comprises rotors equipped to both sides of the pedal rotor in an axial direction, respectively, and relatively rotatable to the pedal rotor. The accelerator device further comprises first helical teeth integrated with the pedal rotor to project toward both the rotors, respectively, as being on a side in an accelerator closing direction. The accelerator device further comprises second helical teeth integrated with the rotors, respectively, to project toward the pedal rotor, as being on a side in an accelerator opening direction, the second helical teeth being configured to engage with the first helical teeth and to bias both the rotors toward the support member when the pedal rotor rotates in the accelerator opening direction, the second helical teeth being formed to enable the pedal rotor to rotate to the accelerator full-close position without interfering with the first helical teeth when the pedal rotor rotates in the accelerator closing direction. The accelerator device further comprises a first biasing unit configured to bias both the rotors in the accelerator closing direction. The accelerator device further comprises a second biasing unit configured to bias at least one of the accelerator pedal, the first shaft, and the pedal rotor in the accelerator closing direction.

According to another aspect of the present disclosure, an accelerator device comprises a support member configured to be affixed to a vehicle body. The accelerator device further comprises a first shaft rotatably supported by the support member. The accelerator device further comprises a second shaft axially in parallel with the first shaft and rotatably supported by the support member. The accelerator device further comprises an accelerator pedal integrated with the first shaft and connected with the second shaft such that the second shaft is rotatable according to a quantity of depression on the accelerator pedal. The accelerator device further comprises a rotation angle detection unit configured to detect a relative rotation angle of the second shaft to the support member. The accelerator device further comprises a pedal rotor integrated with the second shaft. The accelerator device further comprises rotors equipped to both sides of the pedal rotor in an axial direction, respectively, and relatively rotatable to the pedal rotor. The accelerator device further comprises a first helical teeth integrated with the pedal rotor to project toward both the rotors, as being on a side in an accelerator closing direction. The accelerator device further comprises a second helical teeth integrated with both the rotors to project toward the pedal rotor, as being on a side in an accelerator opening direction, the second helical teeth being configured to engage with the first helical teeth and to bias both the rotors toward the support member when the pedal rotor rotates in the accelerator opening direction, the second helical teeth being formed to enable the pedal rotor to rotate to the accelerator full-close position without interfering with the first helical teeth when the pedal rotor rotates in the accelerator closing direction. The accelerator device further comprises a first biasing unit configured to bias both the rotors in the accelerator closing direction. The accelerator device further comprises a second biasing unit configured to bias at least one of the accelerator pedal, the first shaft, the second shaft, and the pedal rotor in the accelerator closing direction.

BRIEF DESCRIPTION OF THE DRAWINGS

The above and other objects, features and advantages of the present invention will become more apparent from the following detailed description made with reference to the accompanying drawings. In the drawings:

FIG. 7A is a schematic diagram showing the accelerator pedal of the accelerator device of FIG. 1 when being not depressed, and FIG. 7B is a schematic diagram showing the accelerator pedal when being depressed;

DETAILED DESCRIPTION

As follows, multiple embodiments of the present invention will be described with reference to drawings.

First Embodiment

FIG. 1 to FIG. 5 show an accelerator device according to the first embodiment. An accelerator device 1 is an input device operated by an operator of a vehicle in order to manipulate a valve opening of a throttle valve (not shown) for controlling an amount of intake air of a vehicular engine (not shown). The accelerator device 1 employs an electrically operated configuration. The electrically-operated accelerator device 1 transmits information about a depression quantity of an accelerator pedal 11, as an electric signal, to an electronic control unit (not shown). The electronic control unit causes a throttle actuator (not shown) to drive a throttle valve according to information about the depression quantity and/or other information.

Figure 1:
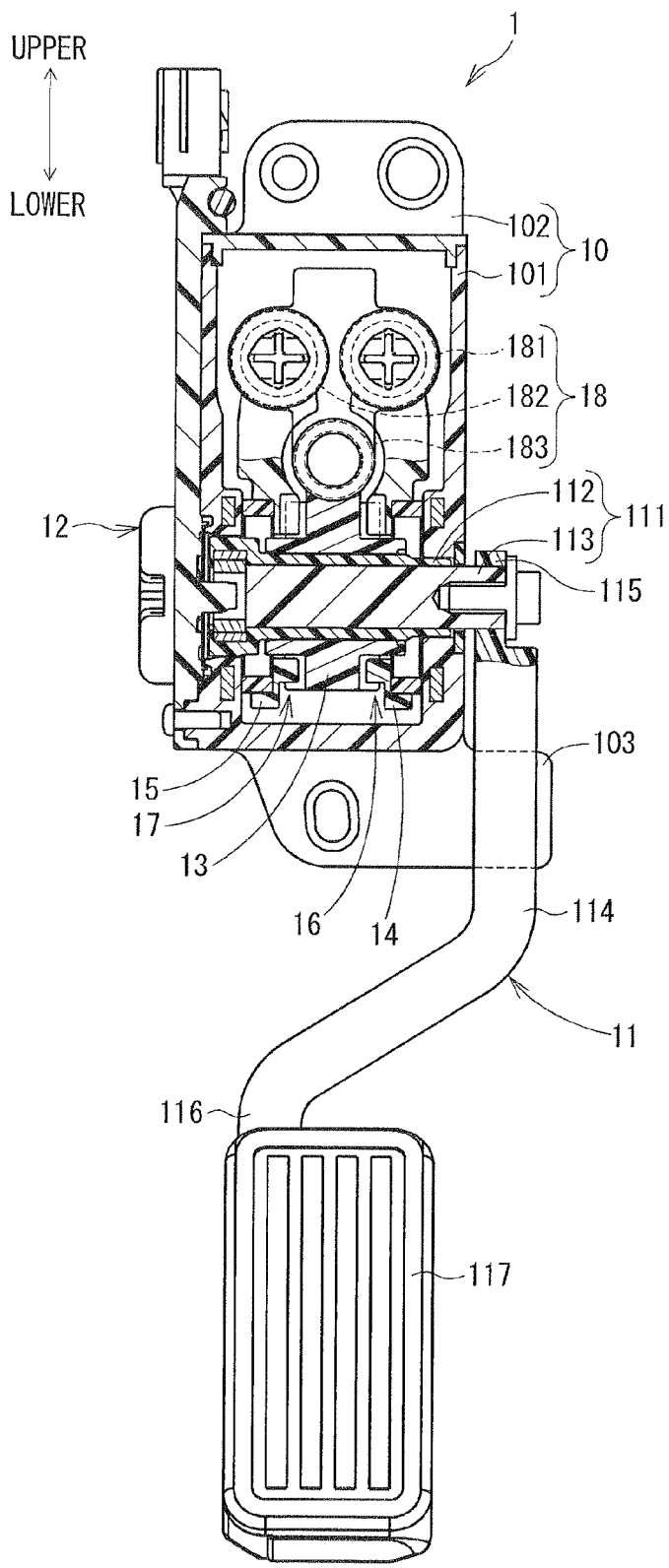
FIG. 1 is an overview showing an accelerator device according to a first embodiment of the present disclosure.
Figure 2:
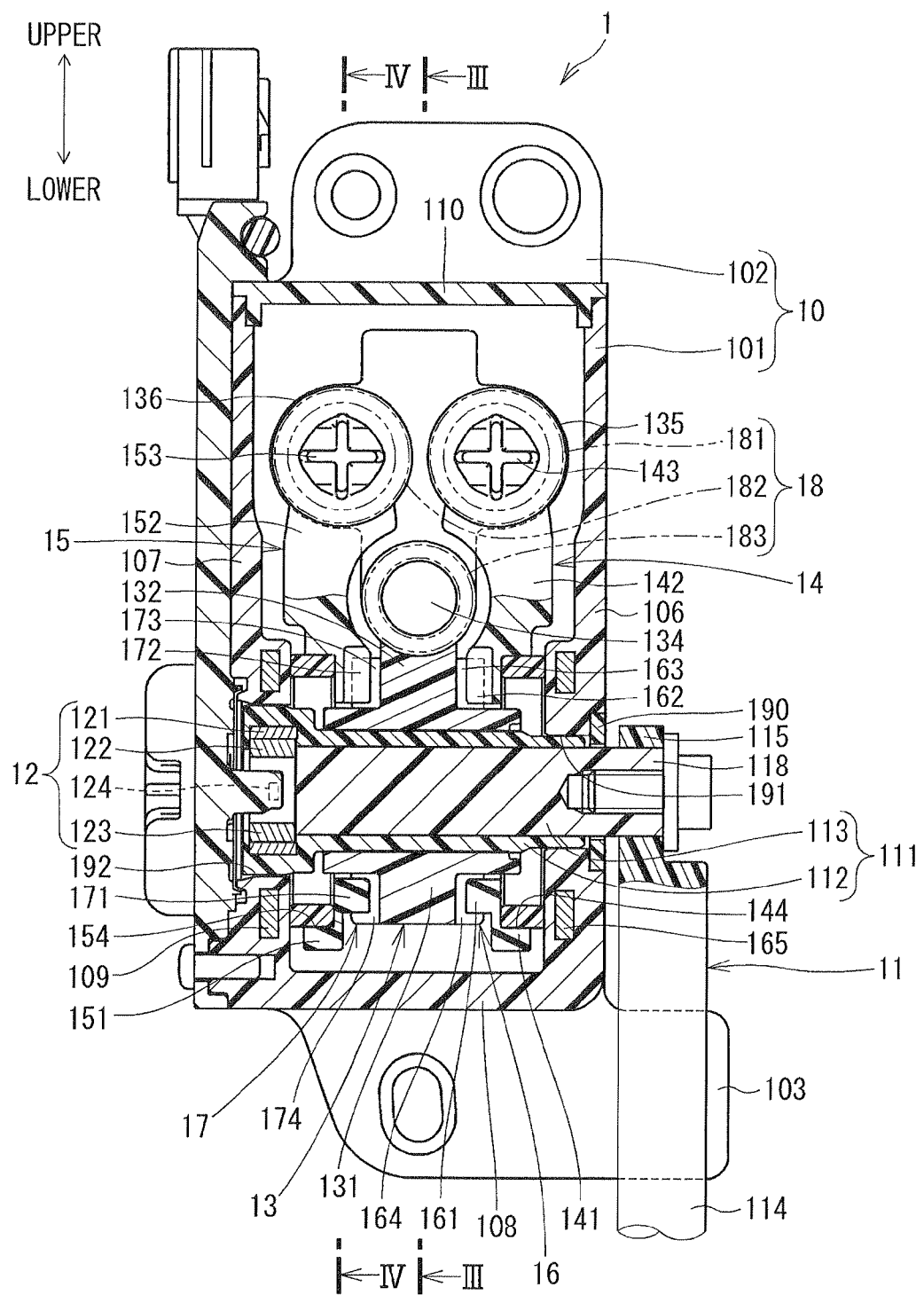
FIG. 2 is a sectional view showing an upper portion of the accelerator device.
Figure 3:
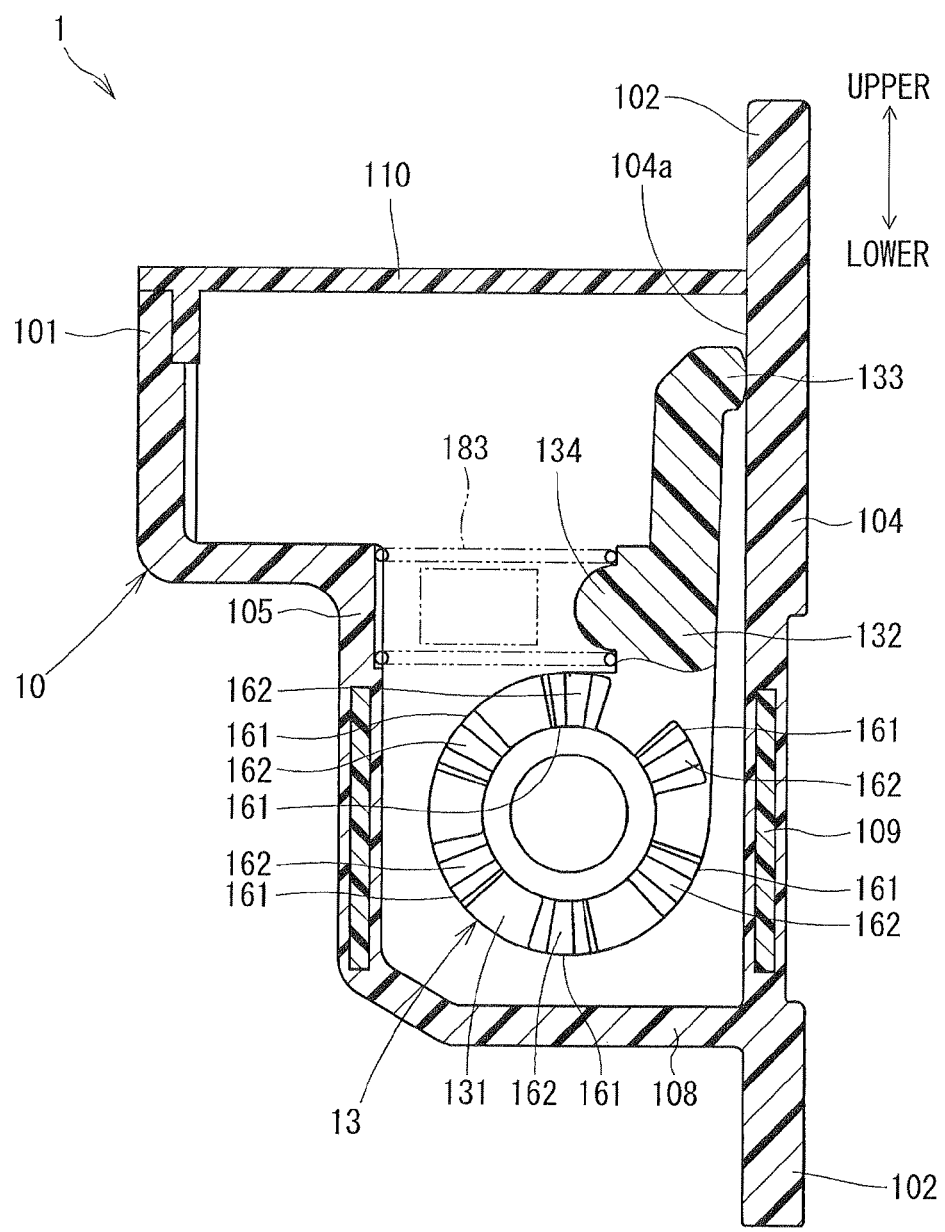
FIG. 3 is a sectional view taken along a line III-III in FIG. 2.
Figure 4:
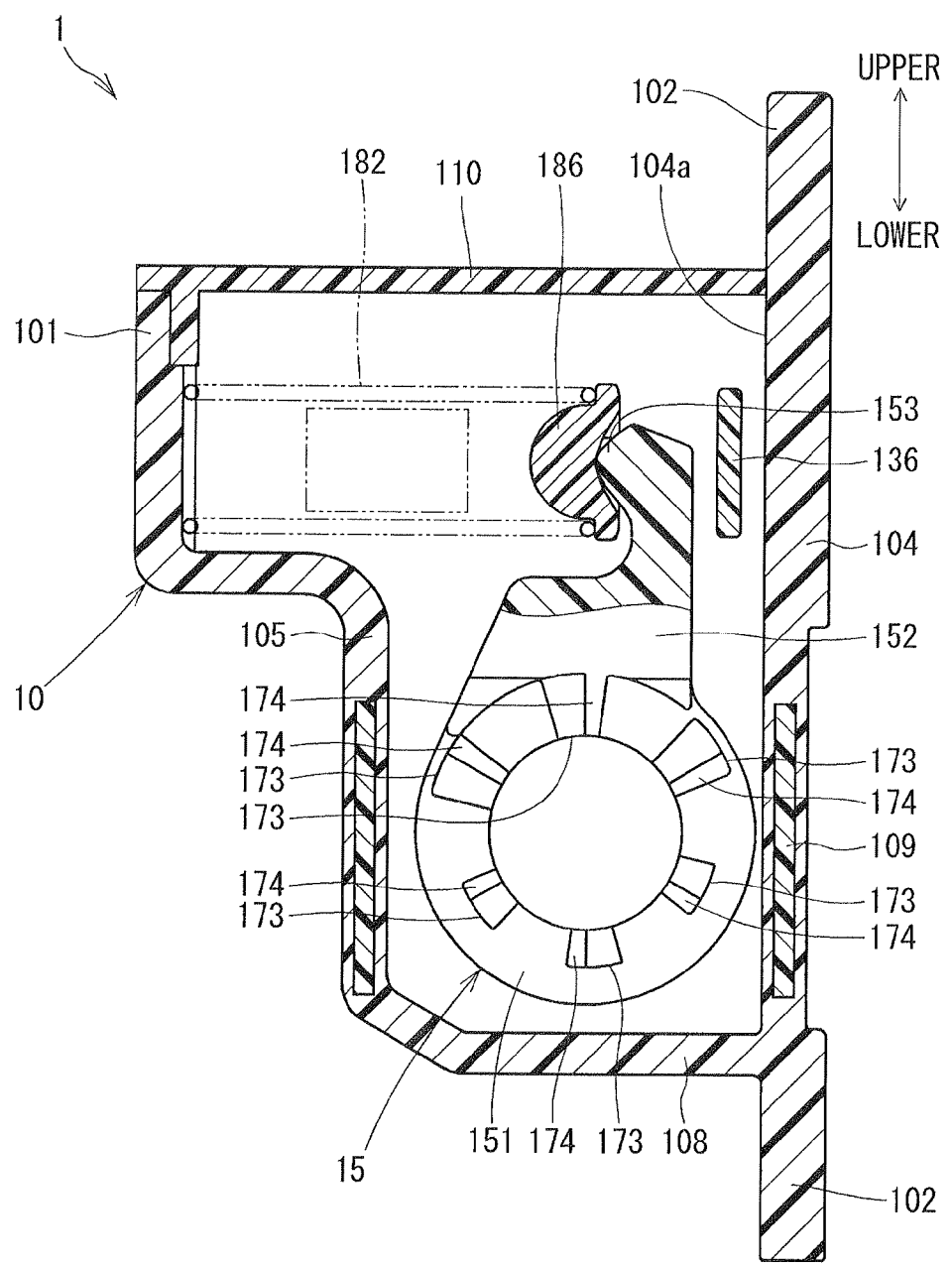
FIG. 4 is a sectional view taken along a line IV-IV in FIG. 2.
Figure 5:
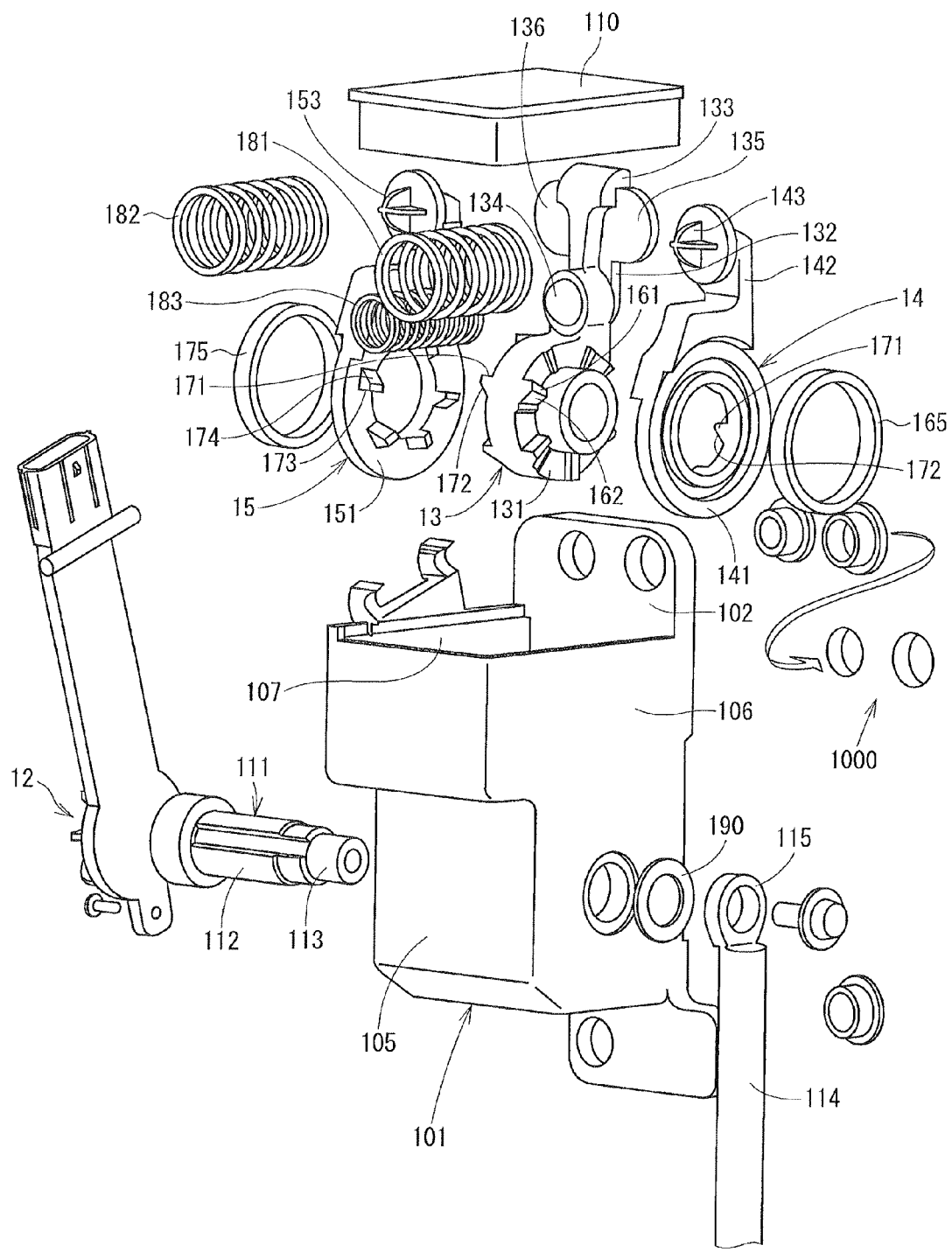
FIG. 5 is an exploded perspective view showing the accelerator device.

The accelerator device 1 includes a support member 10, a shaft 111, the accelerator pedal 11, a rotary position sensor 12, a pedal rotor 13, a first tread force hysteresis mechanism 16, a second tread force hysteresis mechanism 17, a biasing unit 18, and the like. FIG. 1 to FIG. 4 show the accelerator device 1 in a physical relationship when mounted to a vehicle body 1000 (FIG. 5). In the following description, the upper side in FIG. 1 to FIG. 4 is represented by "upper," and the lower side in FIG. 1 to FIG. 4 is represented by "lower."

The support member 10 is configured with a housing portion 101, which is in a hollow box-like shape, and a mounting portion 102. The housing portion 101 includes a front portion 104, the rear portion 105, a first shaft support portion 106, a second shaft support portion 107, a bottom portion 108, and a cover 110. The front portion 104 and the rear portion 105 are opposed to each other in the front-rear direction of the vehicle. The first shaft support portion 106, the second shaft support portion 107, and the bottom portion 108 connect the front portion 104 with the rear portion 105. The cover 110 closes the upper opening of the housing portion 101. The mounting portion 102 is extended in the upper-lower direction from the front portion 104. The mounting portion 102 is attachable to a structure such as a wall partitioning the vehicle interior. The mounting portion 102 forms a full-open stopper portion 103 configured to contact with the accelerator pedal 11, which is rotated to its accelerator full-open position. The accelerator full-open position is set at the position where the treading-in degree of the accelerator pedal 11, i.e., the accelerator position (accelerator opening) caused by an operator is about 100%.

The first shaft support portion 106 and the second shaft support portion 107 are located in parallel to each other. The first shaft support portion 106 functions as a receiving portion of a pressing force of a first rotor 14. The second shaft support portion 107 functions as a receiving portion of a pressing force of a second rotor 15. The support member 10 is molded from resin to include the front portion 104, the rear portion 105, the first shaft support portion 106, and the second shaft support portion 107 to embed a metallic reinforcement member 109 therein. The support member 10 is manufactured by, for example, insert molding. The reinforcement member 109 is a cylindrical member having an opened upper portion and an opened lower portion.

The shaft (first shaft) 111 includes a hollow cylinder portion 112 and a solid column portion 113. The hollow cylinder portion 112 is rotatably supported at both ends by the first shaft support portion 106 and the second shaft support portion 107. One end of the hollow cylinder portion 112 is fitted in a first through hole 191 of the first shaft support portion 106. The other end of the hollow cylinder portion 112 is fitted in a second through hole 192 of the second shaft support portion 107. The other end of the hollow cylinder portion 112 has the diameter, which is larger than the diameter of the one end of the hollow cylinder portion 112.

The hollow cylinder portion 112 is fitted with the solid column portion 113. One end 118 of the solid column portion 113 extends through the first through hole 191 of the first shaft support portion 106 to the outside of the housing portion 101. An annular lid member 190 is equipped to the first shaft support portion 106. The lid member 190 covers the gap between the first through hole 191 and the one end 118 of the solid column portion 113.

The accelerator pedal 11 includes a pedal rod 114, a pedal pad 117, and the pedal rotor 13. The pedal rod 114 includes a fixed end portion 115. The fixed end portion 115 is connected to the one end 118 of the solid column portion 113 of the shaft 111 at the outside of the housing portion 101 of the support member 10. The pedal rod 114 includes a free end portion 116, which is configured to swing around the axial center of the shaft 111. The free end portion 116 is fixed with the pedal pad 117. An operator depresses the pedal pad 117 to operate the accelerator pedal 11.

The pedal rotor 13 is located between the first shaft support portion 106 and the second shaft support portion 107 and is accommodated in the housing portion 101. The pedal rotor 13 is configured with a pedal boss portion 131, a pedal lever portion 132, a full close stopper portion 133, a pedal spring retaining portion 134, a first spring receiving portion 135, and a second spring receiving portion 136. The pedal boss portion (boss) 131 is in an annular shape and fitted in the hollow cylinder portion 112 of the shaft 111. The pedal boss portion 131 is rotatable integrally with the shaft 111. The pedal lever portion (lever) 132 is projected from the pedal boss portion 131 radially outward to the upper side of the inner space of the housing portion 101. In the first embodiment, the pedal lever portion 132 is located on the opposite side of the pedal rod 114 through the shaft 111.

A full close stopper portion (stopper) 133 is formed in the tip end of the pedal lever portion 132. The full close stopper portion 133 is located at an upper area in the housing portion 101. The full close stopper portion 133 is opposed to a vertical inner wall 104a defined by the front portion 104 of the support member 10. Rotation of the accelerator pedal 11 in the accelerator closing direction is restricted when the full close stopper portion 133 of the pedal rotor 13 makes contact with the inner wall 104a. The pedal lever portion 132 is erected in parallel with the inner wall 104a when the full close stopper portion 133 is about in contact with the inner wall 104a. According to the first embodiment, the rotational position of the accelerator pedal 11 is at the accelerator full-close position in its control when the full close stopper portion 133 is in contact with the inner wall 104a. At the accelerator full-close position in its control, the treading-in degree, i.e., the accelerator position of the accelerator pedal 11 caused by an operator is 0%. As follows, the accelerator full-close position in its control is defined as "accelerator full-close position."

The accelerator opening direction is the rotation direction in which the full close stopper portion 133 of the pedal rotor 13 is spaced away from the inner wall 104a of the housing portion 101. That is, the accelerator pedal 11 rotates in the accelerator opening direction when an operator depresses the accelerator pedal 11. When the accelerator pedal 11 rotates in the accelerator opening direction, the rotation angle of the accelerator pedal 11 increases in the accelerator opening direction relative to the accelerator full-close position, and the accelerator position becomes large correspondingly to the rotation angle.

The accelerator close direction is the rotation direction in which the full close stopper portion 133 of the pedal rotor 13 approaches the inner wall 104a of the housing portion 101. That is, the accelerator pedal 11 rotates in the accelerator close direction when an operator releases depression of the accelerator pedal 11. When the accelerator pedal 11 rotates in the accelerator closing direction, the rotation angle of the accelerator pedal 11 decreases, and the accelerator position also becomes small.

The pedal spring retaining portion 134 is formed in an intermediate portion of the pedal lever portion 132 of the pedal rotor 13 located between the pedal boss portion 131 and the full close stopper portion 133. The first spring receiving portion 135 is located on the accelerator closing side relative to a first spring retaining portion 143 of the first rotor 14. The first spring receiving portion 135 is integrally formed with the pedal lever portion 132. The second spring receiving portion 136 is located on the accelerator closing side relative to a second spring retaining portion 153 of the second rotor 15. The second spring receiving portion 136 is integrally formed with the pedal lever portion 132.

A rotary position sensor (rotation angle detection unit) 12 includes a yoke 121, a magnet 122, a magnet 123, a hall element 124, and the like. The yoke 121 is formed from a metallic material and is in a tubular shape. The yoke 121 is fixed to the inner wall of the other end of the hollow cylinder portion 112 of the shaft 111. The magnets 122 and 123 are located in the yoke 121, such that the magnets 122 and 123 oppose to each other through the axial center of the shaft 111. The magnets 122 and 123 are fixed to the inner wall of the yoke 121. The magnets 122 and 123 are arranged such that inner magnetic poles of the magnets 122 and 123 are opposed to each other and are different from each other. The hall element 124 is located between the magnets 122 and 123 and is mounted on a substrate (not shown) fixed to the housing portion 101.

In a condition where an electric current flows in the hall element 124, when the hall element 124 is applied with a magnetic field, the hall element 124 causes a potential difference. The phenomenon is called Hall effect. The density of a magnetic flux passing through the hall element 124 changes as the magnets 122 and 123 rotate with the shaft 111 around the axial center of the shaft 111. The potential difference is substantially in proportion to the density of the magnetic flux passing through the hall element 124. The rotary position sensor 12 detects the potential difference generated in the hall element 124 thereby to detect the rotation angle of the hall element 124 relative to the magnets 122 and 123, the relative rotation angle of the shaft 111 to the support member 10. The rotary position sensor 12 sends an electric signal, which represents the detected potential difference, to an electronic control unit.

The first tread force hysteresis mechanism 16 includes the first rotor 14, a first helical tooth 161, a second helical tooth 163, and a first friction member 165. The first rotor 14 is located between the pedal rotor 13 and the first shaft support portion 106 of the housing portion 101. The first rotor 14 is rotatable relative to the shaft 111. The first rotor 14 is configured to approach the first shaft support portion 106 and to move away from the first shaft support portion 106. The first rotor 14 includes a first boss portion 141, a first lever portion 142, and the first spring retaining portion 143. The first boss portion 141 is in an annular shape and is concentric with the shaft 111. The first lever portion 142 is extended from the first boss portion 141 radially outward to an upper area in the housing portion 101. The first spring retaining portion 143 is formed at the tip end of the first lever portion 142.

The first helical tooth 161 is integrally formed with the pedal rotor 13, such that the first helical tooth 161 is further projected from the pedal rotor 13 toward the first rotor 14 on the accelerator closing side. Multiple first helical teeth 161 are arranged in the circumferential direction at regular intervals. According to the first embodiment, for example, six pieces of the first helical teeth 161 are formed. The first helical tooth 161 has a first engagement slope 162, which approaches the first rotor 14 on the side in the accelerator closing direction.

The second helical tooth 163 is integrally formed with the first rotor 14, such that the second helical tooth 163 is further projected from the first rotor 14 toward the pedal rotor 13 on the accelerator opening side. Multiple second helical teeth 163 are arranged in the circumferential direction at regular intervals. According to the first embodiment, for example, six pieces of the second helical teeth 163 are formed. The second helical tooth 163 has a first engaged slope 164, which approaches the pedal rotor 13 on the accelerator opening side. When the pedal rotor 13 rotates in the accelerator opening direction, the first engaged slope 164 is configured to engage with the first engagement slope 162 of the first helical tooth 161.

The second helical tooth 163 is formed such that the accelerator pedal 11 is rotatable to the accelerator full-close position when the accelerator pedal 11 rotates in the accelerator closing direction, without causing interference with the first helical tooth 161, irrespective of the rotational position of the first rotor 14. Specifically, the angle between a pair of the second helical teeth 163, which are adjacent to each other in the circumferential direction, is set to be greater than the rotation angle of the accelerator pedal 11 from the accelerator full-close position to the accelerator full-open position. That is, the clearance formed between the first helical tooth 161 and the second helical tooth 163 in the circumferential direction allows rotation of the pedal rotor 13 from the accelerator full-close position to the accelerator full-open position.

When the pedal rotor 13 rotates in the accelerator opening direction, the first helical tooth 161 and the second helical tooth 163 are in contact with and are engaged to each other at the first engagement slope 162 and the first engaged slope 164. The first engaged slope 164 slides relative to the first engagement slope 162, as the rotation angle of the pedal rotor 13 increases, such that the first rotor 14 is spaced from the pedal rotor 13. In this way, as the rotation angle of the pedal rotor 13 increases, the second helical tooth 163 applies greater force to the first rotor 14 to bias the first rotor 14 toward the first shaft support portion 106.

The first friction member 165 is formed in an annular shape and is fitted in a first fitting hole 144. The first fitting hole 144 is formed in the surface of the first rotor 14 opposed to the first shaft support portion 106. The first friction member 165 is frictionally engaged with the first shaft support portion 106. The frictional force between the first friction member 165 and the first shaft support portion 106 causes a rotational resistance relative to the first rotor 14 and the accelerator pedal 11 in conjunction with the first rotor 14. The first friction member 165 applies a frictional resistance torque to the first rotor 14. The frictional resistance torque increases, as the pressing force from the second helical tooth 163 to the first rotor 14 toward the first shaft support portion 106 becomes greater.

The second tread force hysteresis mechanism 17 includes the second rotor 15, a first helical tooth 171, a second helical tooth 173, and a second friction member 175. The second rotor 15 is located between the pedal rotor 13 and the second shaft support portion 107 of the housing portion 101. The second rotor 15 is rotatable relative to the shaft 111. The second rotor 15 is configured to approach the second shaft support portion 107 and to move away from the second shaft support portion 107. The second rotor 15 includes a second boss portion 151, a second lever portion 152, and the second spring retaining portion 153. The second boss portion 151 is in an annular shape and is concentric with the shaft 111. The second lever portion 152 is extended from the second boss portion 151 radially outward to an upper area in the housing portion 101. The second spring retaining portion 153 is formed at the tip end of the second lever portion 152.

The first helical tooth 171 is integrally formed with the pedal rotor 13, such that the first helical tooth 171 is further projected from the pedal rotor 13 toward the second rotor 15 on the side in the accelerator closing direction. Multiple first helical teeth 171 are arranged in the circumferential direction at regular intervals. According to the first embodiment, for example, six pieces of the first helical teeth 171 are formed. The first helical tooth 171 has a second engagement slope 172, which approaches the second rotor 15 on the accelerator closing side.

The second helical tooth 173 is integrally formed with the second rotor 15, such that the second helical tooth 173 is further projected from the second rotor 15 toward the pedal rotor 13 on the accelerator opening side. Multiple second helical teeth 173 are arranged in the circumferential direction at regular intervals. According to the first embodiment, for example, six pieces of the second helical teeth 173 are formed. The second helical tooth 173 has a second engaged slope 174, which approaches the pedal rotor 13 on the accelerator opening side. When the pedal rotor 13 rotates in the accelerator opening direction, the second engaged slope 174 is configured to engage with the second engagement slope 172 of the first helical tooth 171.

The second helical tooth 173 is formed such that the accelerator pedal 11 is rotatable to the accelerator full-close position when the accelerator pedal 11 rotates in the accelerator closing direction, without causing interference with the first helical tooth 171, irrespective of the rotational position of the second rotor 15. Specifically, the angle between a pair of the second helical teeth 173, which are adjacent to each other in the circumferential direction, is set to be greater than the rotation angle of the accelerator pedal 11 from the accelerator full-close position to the accelerator full-open position. That is, the clearance formed between the first helical tooth 171 and the second helical tooth 173 in the circumferential direction allows rotation of the pedal rotor 13 from the accelerator full-close position to the accelerator full-open position.

When the pedal rotor 13 rotates in the accelerator opening direction, the first helical tooth 171 and the second helical tooth 173 are in contact with and are engaged to each other at the second engagement slope 172 and the second engaged slope 174. The second engaged slope 174 slides relative to the second engagement slope 172, as the rotation angle of the pedal rotor 13 increases, such that the second rotor 15 is spaced from the pedal rotor 13. In this way, as the rotation angle of the pedal rotor 13 increases, the second helical tooth 173 applies greater force to the second rotor 15 to bias the second rotor 15 toward the second shaft support portion 107.

The second friction member 175 is formed in an annular shape and is fitted in a second fitting hole 154. The second fitting hole 154 is formed in the surface of the second rotor 15 opposed to the second shaft support portion 107. The second friction member 175 is frictionally engaged with the second shaft support portion 107. The frictional force between the second friction member 175 and the second shaft support portion 107 causes a rotational resistance relative to the second rotor 15 and the accelerator pedal 11 in conjunction with the second rotor 15. The second friction member 175 applies a frictional resistance torque to the second rotor 15. The frictional resistance torque increases, as the pressing force from the second helical tooth 173 to the second rotor 15 toward the second shaft support portion 107 becomes greater.

The biasing unit 18 includes a first spring 181 and a second spring 182, which function as a first biasing unit, and a third spring 183, which functions as a second biasing unit. The first spring 181 is a coil spring, which is retained by a first spring holder 185 at one end and is retained by a rear portion 105 of the housing portion 101 at the other end. The first spring holder 185 is engaged with the first spring retaining portion 143 of the first rotor 14. The first spring 181 biases the first rotor 14 in the accelerator closing direction. As the rotation angle of the first rotor 14 increases, the biasing force working from the first spring 181 to the first rotor 14 increases. The biasing force of the first spring 181 works on the pedal rotor 13 through the first rotor 14 and the like.

The second spring 182 is a coil spring, which is retained by a second spring holder 186 at one end and is retained by the rear portion 105 of the housing portion 101 at the other end. The second spring holder 186 is engaged with the second spring retaining portion 153 of the second rotor 15. The second spring 182 biases the second rotor 15 in the accelerator closing direction. As the rotation angle of the second rotor 15 increases, the biasing force working from the second spring 182 to the second rotor 15 increases. The biasing force of the second spring 182 works on the pedal rotor 13 through the second rotor 15 and the like.

The third spring 183 is a coil spring, which is retained by the pedal spring retaining portion 134 of the pedal rotor 13 at one end and is retained by the rear portion 105 of the housing portion 101 at the other end. The third spring 183 biases the pedal rotor 13 in the accelerator closing direction. As the rotation angle of the pedal rotor 13 increases, the biasing force working from the third spring 183 to the pedal rotor 13 increases. The biasing force is set such that the pedal rotor 13 and the first shaft 111 and the accelerator pedal 11, both of which are in conjunction with the pedal rotor 13, are enabled to return to the accelerator full-close position, irrespective of the rotational position of the pedal rotor 13.

As follows, the operation of the accelerator device 1 will be described.

When the pedal pad 117 of the accelerator pedal 11 is depressed, the accelerator pedal 11 rotates around the axial center of the shaft 111 in the accelerator opening direction, according to the tread force applied to the pedal pad 117. In the present state, in order to rotate the shaft 111, it is necessary to apply the tread force to generate a torque greater than the summation of a torque, which is caused by the biasing force of the first spring 181, the biasing force of the second spring 182, and the biasing force of the third spring 183, and a frictional resistance torque, which is caused by the frictional force of the first friction member 165 and the frictional force of the second friction member 175.

Figure 6:
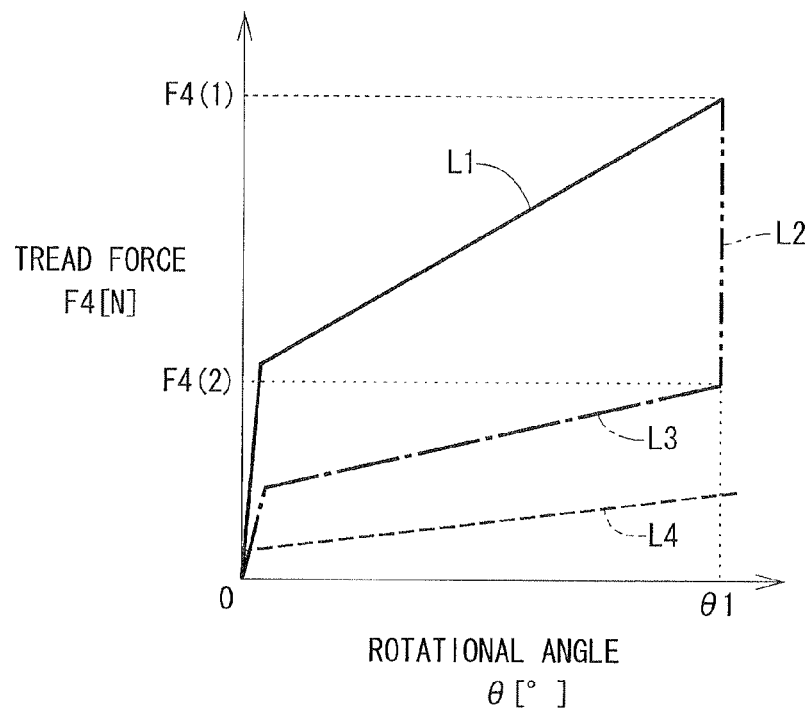
FIG. 6 is a graph showing a relation between a tread force of an accelerator pedal and its rotation angle in the accelerator device of FIG. 1.

The frictional resistance torque caused by the frictional force of the first friction member 165 and the frictional force of the second friction member 175 works to restrict the accelerator pedal 11 from rotating in the accelerator opening direction when the accelerator pedal 11 is depressed. FIG. 6 shows a relation between the tread force F4 [N] and the rotation angle θ [°]. With the present configuration, the tread force F4 represented by the solid line L1 when the accelerator pedal 11 is depressed is greater than the tread force F4 represented by the dashed dotted line L3 when the depression is released at the same rotation angle θ.

Subsequently, in order to maintain the depression of the accelerator pedal 11, it suffices to apply the tread force to generate a torque greater than the difference between the torque, which is caused by the biasing force of the first spring 181, the biasing force of the second spring 182, and the biasing force of the third spring 183, and the frictional resistance torque, which is caused by the frictional force of the first friction member 165 and the frictional force of the second friction member 175. That is, after depressing the accelerator pedal 11 to the desired position, the operator is allowed to reduce the tread force in some degree when maintaining the depression of the accelerator pedal 11.

For example, as represented by the two-dot chain line L2 in FIG. 6, the operator may loosen the tread force F4 (1) to the tread force F4 (2) when maintaining the depression of the accelerator pedal 11 depressed by the rotation angle θ1. With the present configuration, an operator is enabled to maintain the depression of the accelerator pedal 11 easily. The frictional resistance torque caused by the frictional force of the first friction member 165 and the frictional force of the second friction member 175 works to restrict the accelerator pedal 11 from rotating in the accelerator closing direction when depression of the accelerator pedal 11 is maintained.

Subsequently, in order to return the depression of the accelerator pedal 11 to the accelerator full-close position, the operator may apply the tread force to generate a torque less than the difference between the torque, which is caused by the biasing force of the first spring 181, the biasing force of the second spring 182, and the biasing force of the third spring 183, and the frictional resistance torque, which is caused by the frictional force of the first friction member 165 and the frictional force of the second friction member 175. Herein, it suffices to stop the depression of the accelerator pedal 11, when the operator returns the accelerator pedal 11 to the accelerator full-close position quickly. Therefore, the operator is subjected with a less burden. To the contrary, when the operator returns the depression of the accelerator pedal 11 gradually, the operator is required to continue applying a predetermined tread force. According to the first embodiment, the required tread force is relatively small when the operator returns the depression gradually.

For example, as shown by the dashed dotted line L3 in FIG. 6, when the depression of the accelerator pedal 11 at the rotation angle θ1 is returned gradually, it suffices to control the tread force between F4 (2) and 0. The tread force F4 (2) is smaller than the tread force F4 (1). Therefore, less burden is subjected to the operator when returning the depression of the accelerator pedal 11. The frictional resistance torque caused by the frictional force of the first friction member 165 and the frictional force of the second friction member 175 works to restrict the accelerator pedal 11 from rotating in the accelerator closing direction when the accelerator pedal 11 is returned. Consequently, as shown by the relation between the tread force F4 [N] and the rotation angle θ [°] in FIG. 6, the tread force F4 represented by the dashed dotted line L3, when the depression is returned, is less than the tread force F4 represented by the solid line L1, when the depression is made, at the same rotation angle θ.

Herein, it is assumed a case where the first rotor 14 and the second rotor 15 are unable to rotate relative to each other. The situation may occur when, for example, foreign matter sticks between the first friction member 165 and the first shaft support portion 106 or between the second friction member 175 and the second shaft support portion 107. Alternatively, the situation may occur when, for example, a frictional force between the first friction member 165 and the second friction member 175 increases due to environmental variation and/or the like. In such a case, the biasing force of the first spring 181 and the biasing force of the second spring 182 does not work on the pedal rotor 13. Even in such a condition, the biasing force of the third spring 183 works on the pedal rotor 13. Therefore, the accelerator pedal 11 is enabled to return to the accelerator full-close position by the biasing force of the third spring 183. Even if the first rotor 14 and the second rotor 15 are incapable to rotate at the accelerator full-open position, the accelerator pedal 11 is enabled to return to the accelerator full-close position only by the biasing force of the third spring 183 without causing interference with the first rotor 14 and the second rotor 15. The relation between the tread force F4 of the accelerator pedal 11 and the rotation angle θ at this time is represented by the dashed line L4 in FIG. 6.

Subsequently, it is conceivable a case where the third spring 183 is broken, and the first lever portion 142 of the first rotor 14 is also broken. In this case, the biasing force of the first spring 181 does not work on the first rotor 14, consequently. Even in such a case, the biasing force of the first spring 181 works on the pedal rotor 13 through the first spring receiving portion 135 engaged with the first spring retaining portion 143, which is being broken. Subsequently, it is conceivable a case where the third spring 183 is broken, and the second lever portion 152 of the second rotor 15 is also broken. In this case, the biasing force of the second spring 182 does not work on the second rotor 15, consequently. Even in such a case, the biasing force of the second spring 182 works on the pedal rotor 13 through the second spring receiving portion 136 engaged with the second spring retaining portion 153, which is being broken.

Subsequently, the direction of the biasing force working on the shaft 111 before and after depression of the accelerator pedal 11 is considered. As represented by the arrow A in FIG. 7A, when the accelerator pedal 11 is not depressed, the shaft 111 is biased toward the front portion 104 of the housing portion 101 relative to the first through hole 191 and the second through hole 192, by the biasing force F1 of the first spring 181, the biasing force F2 of the second spring 182, and the biasing force F3 of the third spring 183, which are working on the accelerator pedal 11.

To the contrary, as represented by the arrow B in FIG. 7B, when the accelerator pedal 11 is depressed, the shaft 111 is biased toward the front portion 104 of the housing portion 101 relative to the first through hole 191 and the second through hole 192, by the biasing force F1', the biasing force F2', the biasing force F3', and the tread force F4, which are working on the accelerator pedal 11. That is, the direction of the biasing force working on the shaft 111 does not change before and after the depression of the accelerator pedal 11.

As described above, in the accelerator device 1 of the first embodiment, the frictional resistance torque applied to the first rotor 14 and the second rotor 15 works to maintain the accelerator position corresponding to the rotation angle of the accelerator pedal 11 when the depression of the accelerator pedal 11 is released. The present configuration reduces the tread force when the depression of the accelerator pedal 11 is maintained at a desired position, when depression of the accelerator pedal 11 is gradually reduced, and/or the like. Therefore, burden of the operator can be reduced.

Furthermore, the biasing unit 18 of the accelerator device 1 includes the third spring 183, which biases the pedal rotor 13 in the accelerator closing direction, in addition to the first spring 181 and the second spring 182, which bias the first rotor 14 and the second rotor 15 in the accelerator closing direction. The pedal rotor 13 is configured to rotate in the accelerator closing direction to the accelerator full-close position, irrespective of the rotational position of the first rotor 14 and the second rotor 15 and without causing interference with the first rotor 14 and the second rotor 15.

It is conceivable that the frictional force of the first friction member 165 and the second friction member 175 may increase due to environmental variation and/or the like. In this case, the frictional resistance torque working on the first rotor 14 and the second rotor 15 may increase consequently. Alternatively, it is conceivable that foreign matter sticks between the first friction member 165 and the first shaft support portion 106 or between the second friction member 175 and the second shaft support portion 107. In this case, the first rotor 14 may adhere to the second rotor 15 consequently. As a result, the biasing force of the first spring 181 and the second spring 182 may not work on the pedal rotor 13. Even in such conditions, the third spring 183 applies the biasing force to the pedal rotor 13 according to the present configuration. In the present state, the accelerator pedal 11 is enabled to rotate to the accelerator full-close position, irrespective of the rotary positions of the first rotor 14 and the second rotor 15, without causing interference with the second helical teeth 163 and 173, and/or the like. With the present configuration, when depression of the accelerator pedal 11 is released, the accelerator pedal 11 is enabled to return to the accelerator full-close position, irrespective of the rotary positions of the first rotor 14 and the second rotor 15.

In addition, according to the first embodiment, even when two of the first spring 181, the second spring 182, and the third spring 183 are broken, the remaining one functions to return the accelerator pedal 11 to the accelerator full-close position. In addition, according to the first embodiment, the third spring 183 generates the biasing force to return the accelerator pedal 11 to the accelerator full-close position. Therefore, even in a condition where the biasing force of the first spring 181 and the second spring 182 does not work on the pedal rotor 13 at all, the accelerator pedal 11 can be steadily returned to the accelerator full-close position.

In addition, according to the first embodiment, in a condition where the third spring 183 is broken, and the first lever portion 142 of the first rotor 14 is also broken to be unable to apply the biasing force of the first spring 181 to the first rotor 14, the biasing force of the first spring 181 works on the pedal rotor 13 through the first spring receiving portion 135 engaged with the first spring retaining portion 143, which is being broken. In addition, in a condition where the third spring 183 is broken, and the second lever portion 152 of the second rotor 15 is also broken to be unable to apply the biasing force of the second spring 182 to the second rotor 15, the biasing force of the second spring 182 works on the pedal rotor 13 through the second spring receiving portion 136 engaged with the second spring retaining portion 153, which is being broken. Therefore, the pedal rotor 13 can be returned to the accelerator full-close position, when the third spring 183 and the first lever portion 142 are both broken. In addition, the pedal rotor 13 can be returned to the accelerator full-close position, when the third spring 183 and the second lever portion 152 are both broken.

In addition, according to the first embodiment, the support member 10 includes the housing portion 101, which accommodates the pedal rotor 13. The pedal rotor 13 includes the full close stopper portion 133 configured to be in contact with the inner wall 104a of the housing portion 101 to restrict rotation of the accelerator pedal 11 in the accelerator closing direction. In the present configuration, the full close stopper portion 133 is located inside the housing portion 101. Therefore, it is possible to restrict foreign matter from sticking between the full close stopper portion 133 and the inner wall 104a of the housing portion 101.

In addition, according to the first embodiment, the first shaft support portion 106 of the support member 10 has the first through hole 191 through which the one end 118 of the shaft 111 is inserted. The pedal rod 114 of the accelerator pedal 11 is offset relative to the pedal rotor 13 in the axial direction of the shaft 111 and is connected with the one end 118 of the shaft 111 at the outside of the support member 10. In the present configuration, the gap formed between the shaft 111 and the first through hole 191 does not change when the shaft 111 rotates. Therefore, the gap can be set small as much as possible. Thus, it is possible to restrict foreign matter from intruding into the housing portion 101, which accommodates the pedal rotor 13 and the like, irrespective of the rotational position of the accelerator pedal 11. Consequently, it is possible to restrict foreign matter from sticking between the full close stopper portion 133 of the pedal rotor 13 and the inner wall 104a of the housing portion 101.

In addition, according to the first embodiment, the gap between the first through hole 191 of the first shaft support portion 106 and the shaft 111 is covered with the lid member 190. In this way, it is possible further to restrict foreign matter from intruding into the housing portion 101, which accommodates the pedal rotor 13 and the like. In addition, according to the first embodiment, the full close stopper portion 133 of the pedal rotor 13 is located in the upper area inside the housing portion 101, which accommodates the pedal rotor 13 and the like. When the first friction member 165 and the second friction member 175 cause an ablation powder, such ablation powder are generally accumulated in the bottom of the housing portion 101. Therefore, it is possible to restrict such an ablation powder from sticking between the inner wall 104a of the housing portion 101 and the full close stopper portion 133 of the pedal rotor 13 located in the upper area inside the housing portion 101.

Further, according to the first embodiment, the full close stopper portion 133 of the pedal rotor 13 is configured to make contact with the vertical inner wall 104a defined by the housing portion 101 of the support member 10. Therefore, even when ablation powder flies upward in the inner space of the housing portion 101, the ablation powder falls downward in the housing portion 101, without adhering to the inner wall 104a with which the full close stopper portion 133 makes contact. Consequently, it is possible to restrict ablation power or the like from sticking between the full close stopper portion 133 of the pedal rotor 13 and the inner wall 104a of the housing portion 101.

In addition, according to the first embodiment, the pedal lever portion 132 of the pedal rotor 13 is located on the opposite side of the pedal rod 114 through the pedal boss portion 131. In addition, the full close stopper portion 133 of the pedal rotor 13 is formed at the tip end of the pedal lever portion 132, and the pedal spring retaining portion 134 of the pedal rotor 13 is located between the pedal boss portion 131 and the full close stopper portion 133. In the present configuration, in both cases where the accelerator pedal 11 is not depressed and the accelerator pedal 11 is depressed, the shaft 111 is biased toward the same side of the inner wall surfaces of the first through hole 191 and the second through hole 192 of the housing portion 101. That is, the direction of the biasing force working on the shaft 111 does not change before and after the depression of the accelerator pedal 11. Therefore, fluctuation (imperfect alignment) of the shaft 111 in the first through hole 191 and the second through hole 192 of the housing portion 101 can be restricted before and after depression of the accelerator pedal 11. Therefore, it is possible to restrict reduction in the detection accuracy of the rotation angle of the shaft 111 due to the imperfect alignment.

Figure 8:
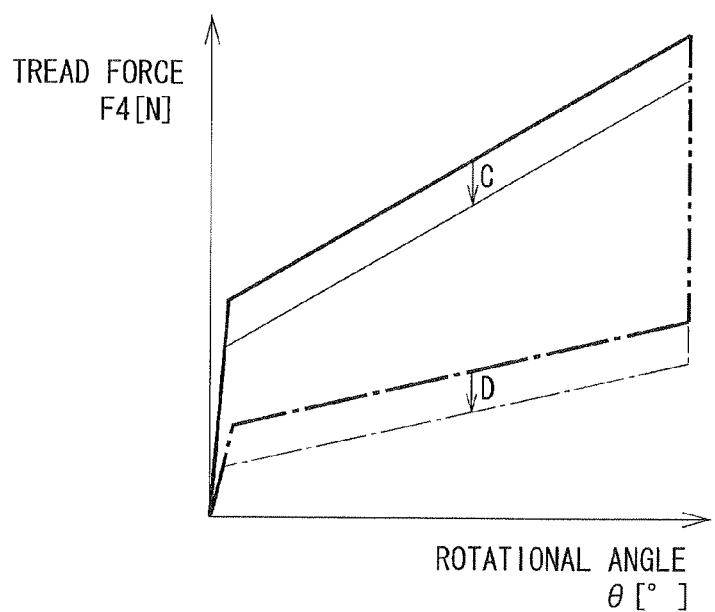
FIG. 8 is a graph showing aging caused in a relation between a tread force of an accelerator pedal and its rotation angle in a conventional accelerator device.

Conventionally, it has been concerned that a support member may be deformed outward to be spaced from a friction member due to pressing force from a pair of friction members of a tread force hysteresis mechanism. As shown by the arrow C and arrow D in FIG. 8, it has been further concerned that the relation between the tread force F4 of the accelerator pedal and the rotation angle θ may vary due to the deformation of the support member. According to the first embodiment, the housing portion 101 of the support member 10 is resin-molded to include the metallic reinforcement member 109 embedded in the first shaft support portion 106 and the second shaft support portion 107. With the present configuration, deformation of the housing portion 101 due to the pressing force from the first friction member 165 and the second friction member 175 can be restricted, while achieving weight reduction. Therefore, it is possible to restrain variation in the tread force characteristic of the accelerator pedal 11 due to deformation of the housing portion 101.

In the following embodiments, description will be made, such that the upper side in a drawing used in the description is "upper" and the lower side in the drawing is "lower."

Modification of First Embodiment

Figure 9:
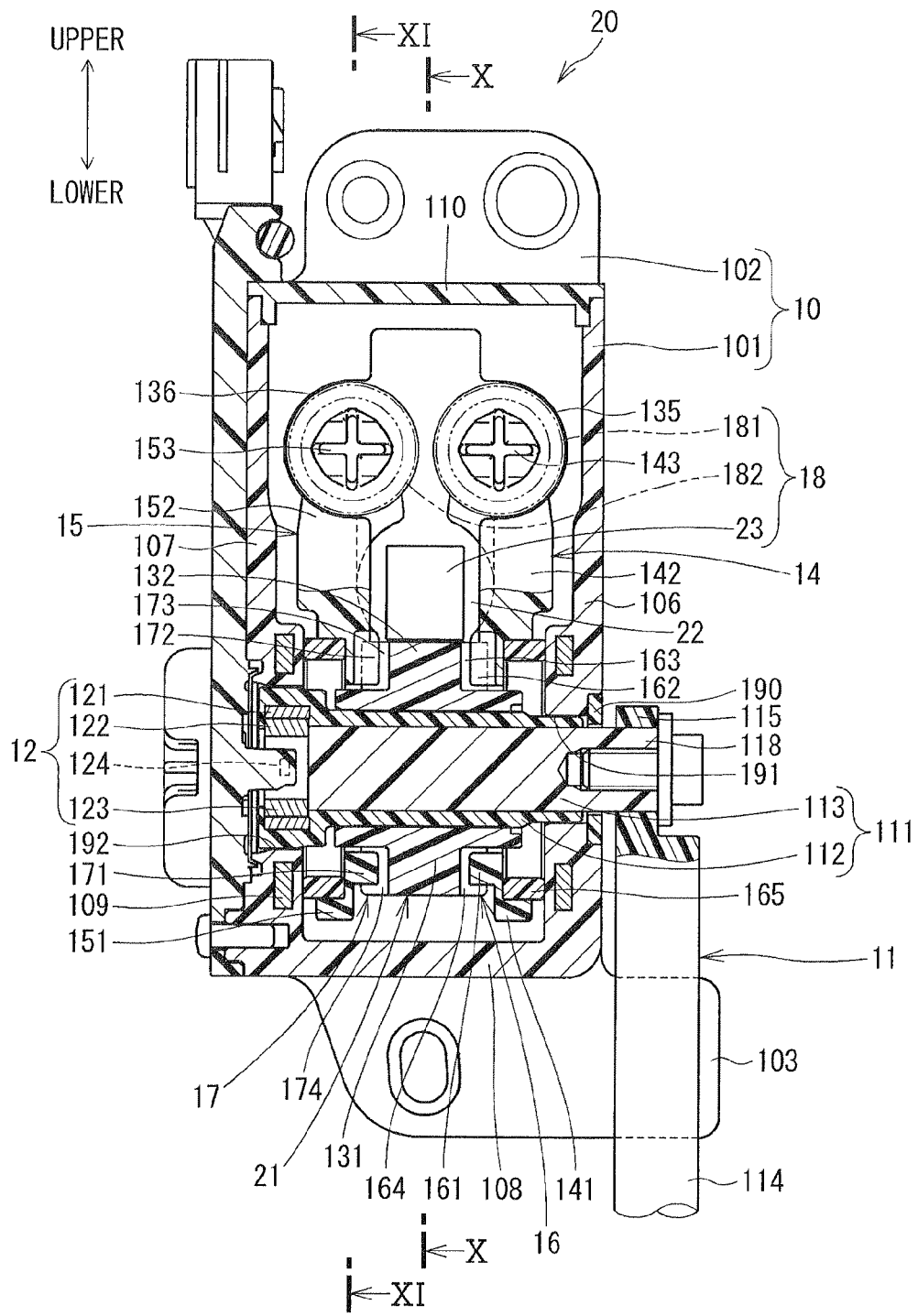
FIG. 9 is an overview showing an accelerator device according to a modification of the first embodiment of the present disclosure.
Figure 10:
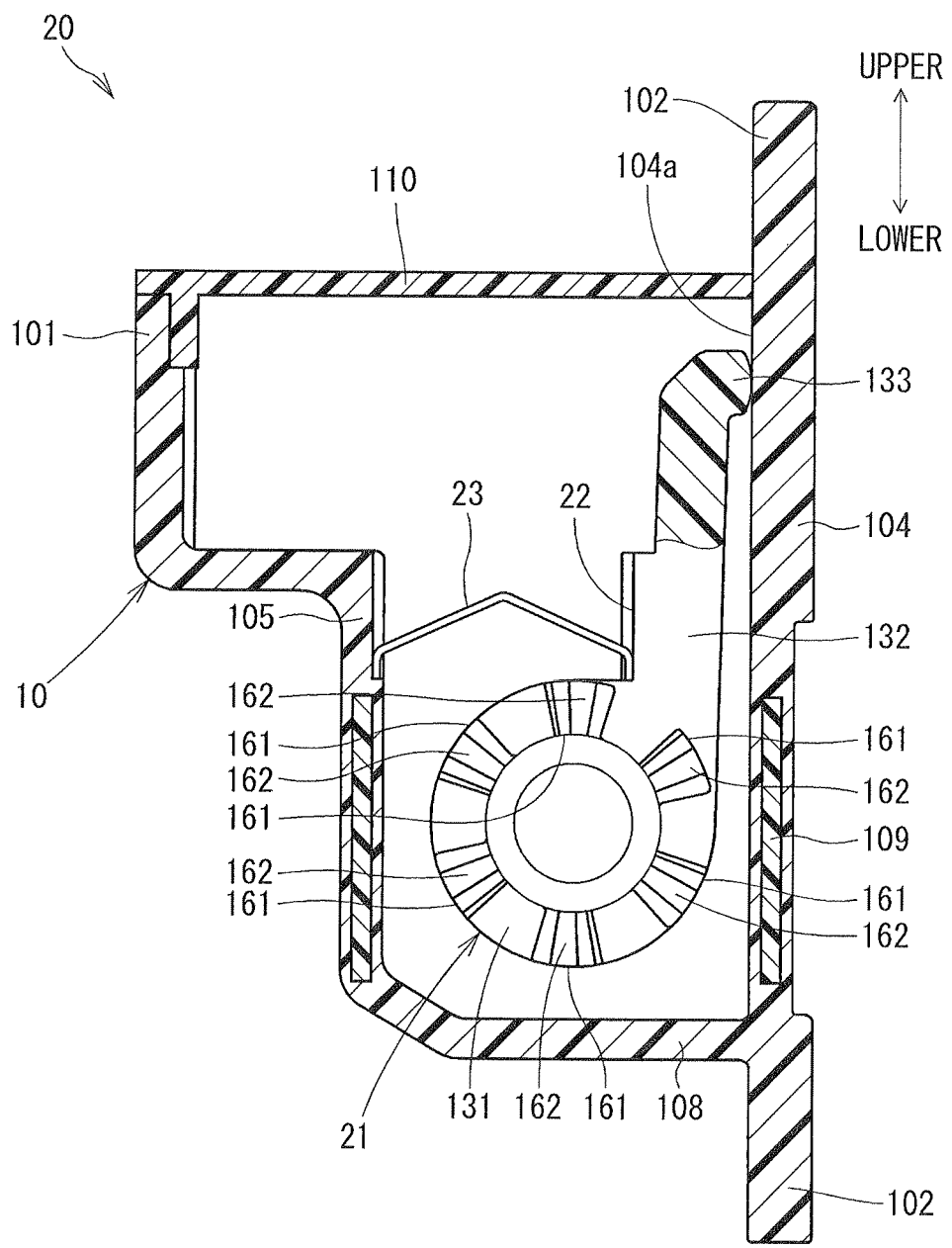
FIG. 10 is a sectional view taken along the line X-X in FIG. 9.
Figure 11:
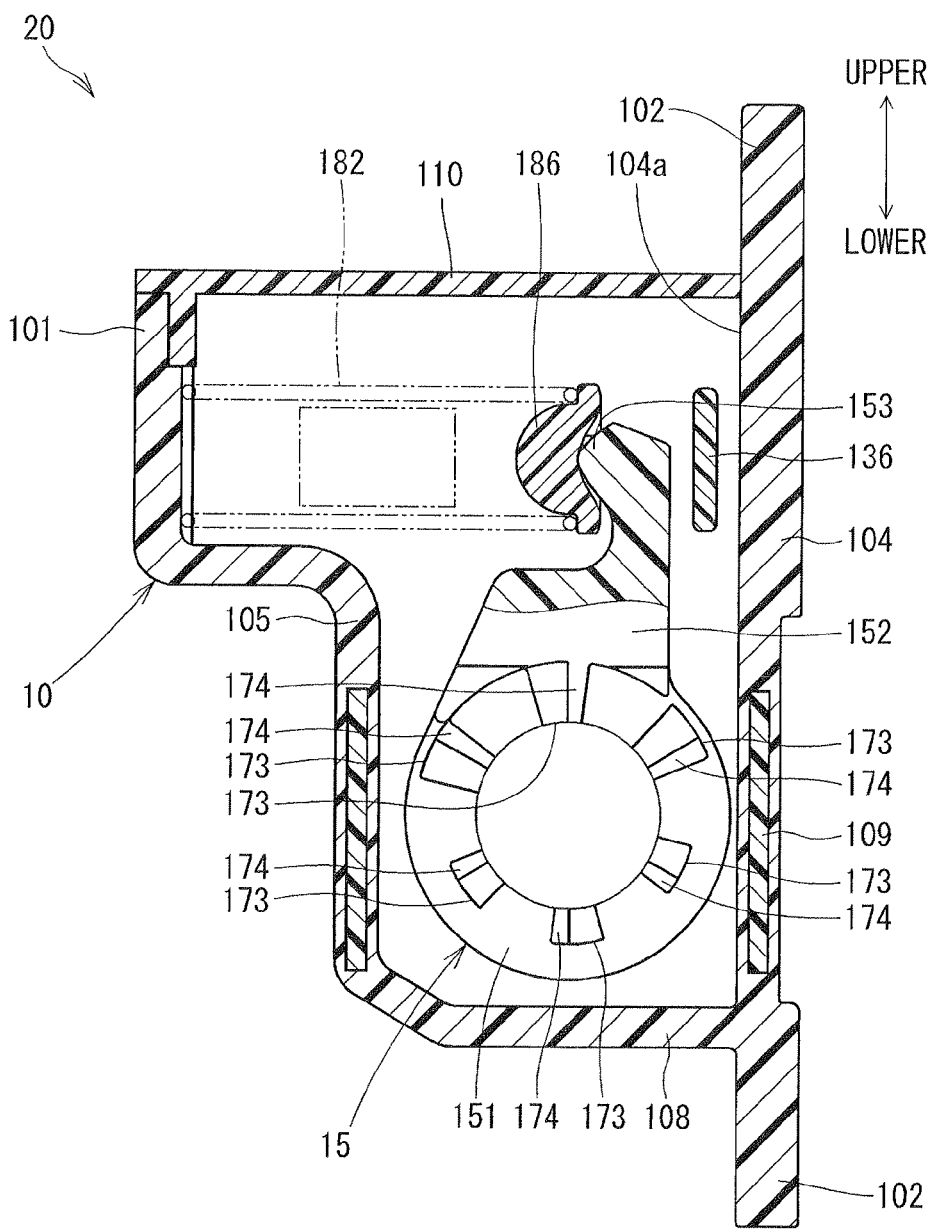
FIG. 11 is a sectional view taken along the line XI-XI in FIG. 9.

FIGS. 9 to 11 show an accelerator device of the modification of the first embodiment. In the present modification, the configurations of the pedal spring retaining portion of the pedal rotor and the third spring differ from those in the first embodiment. In the present modification, a third spring 23 of an accelerator device 20 is configured with a blade spring. A pedal spring retaining portion 22 of a pedal rotor 21 has a plane configured to receive one end of the third spring 23, which is configured with the blade spring. The operation of the third spring 23 is the same as the operation of the third spring 183 of the first embodiment. In the present modification of the first embodiment, configurations other than the above-described configuration are the same as those of the first embodiment. The accelerator device 20 with the present configuration is configured to produce the same effect as that of the accelerator device 1 of the first embodiment.

Second Embodiment

Figure 12:
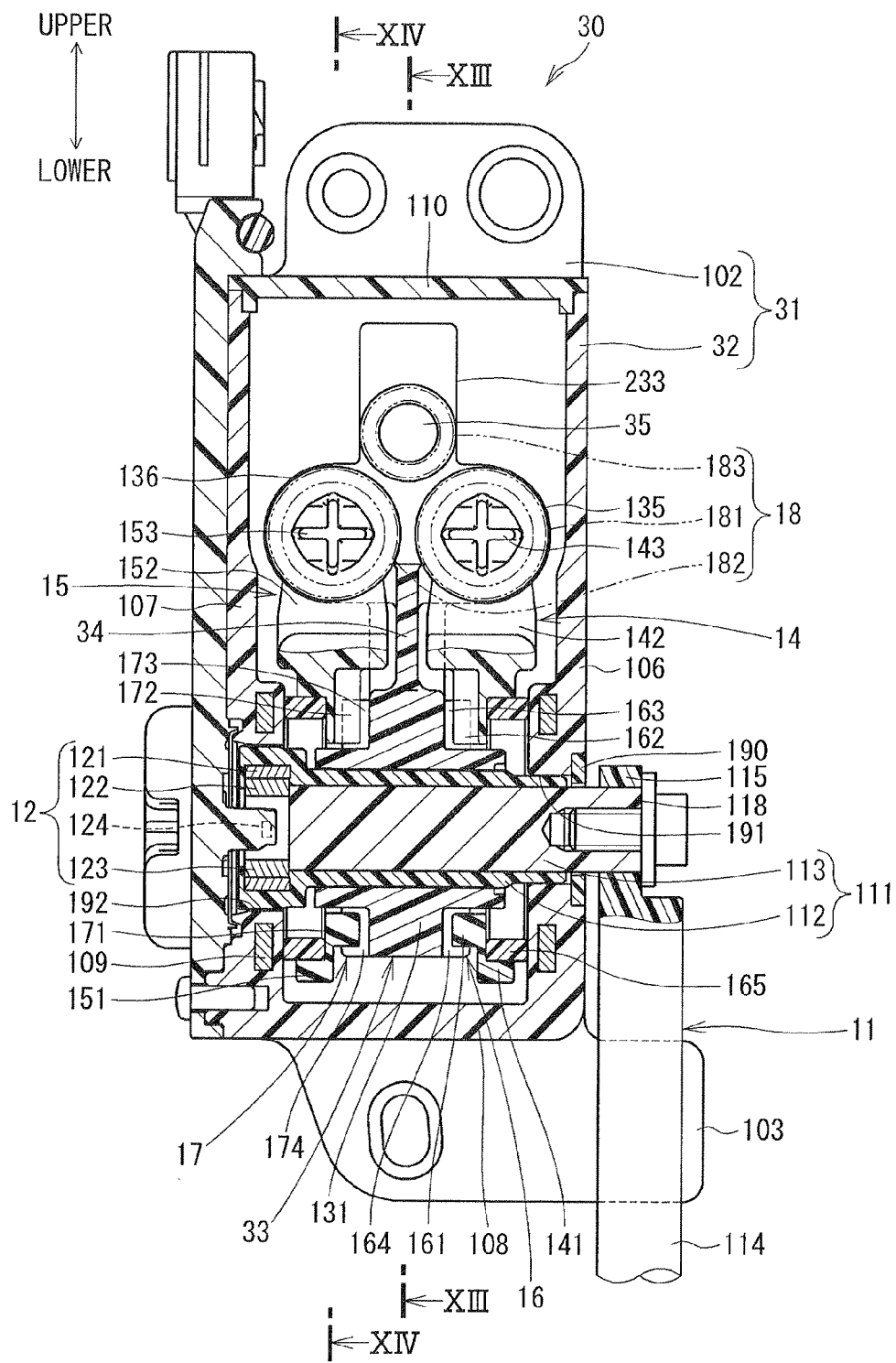
FIG. 12 is an overview showing an accelerator device according to a second embodiment of the present disclosure.
Figure 13:
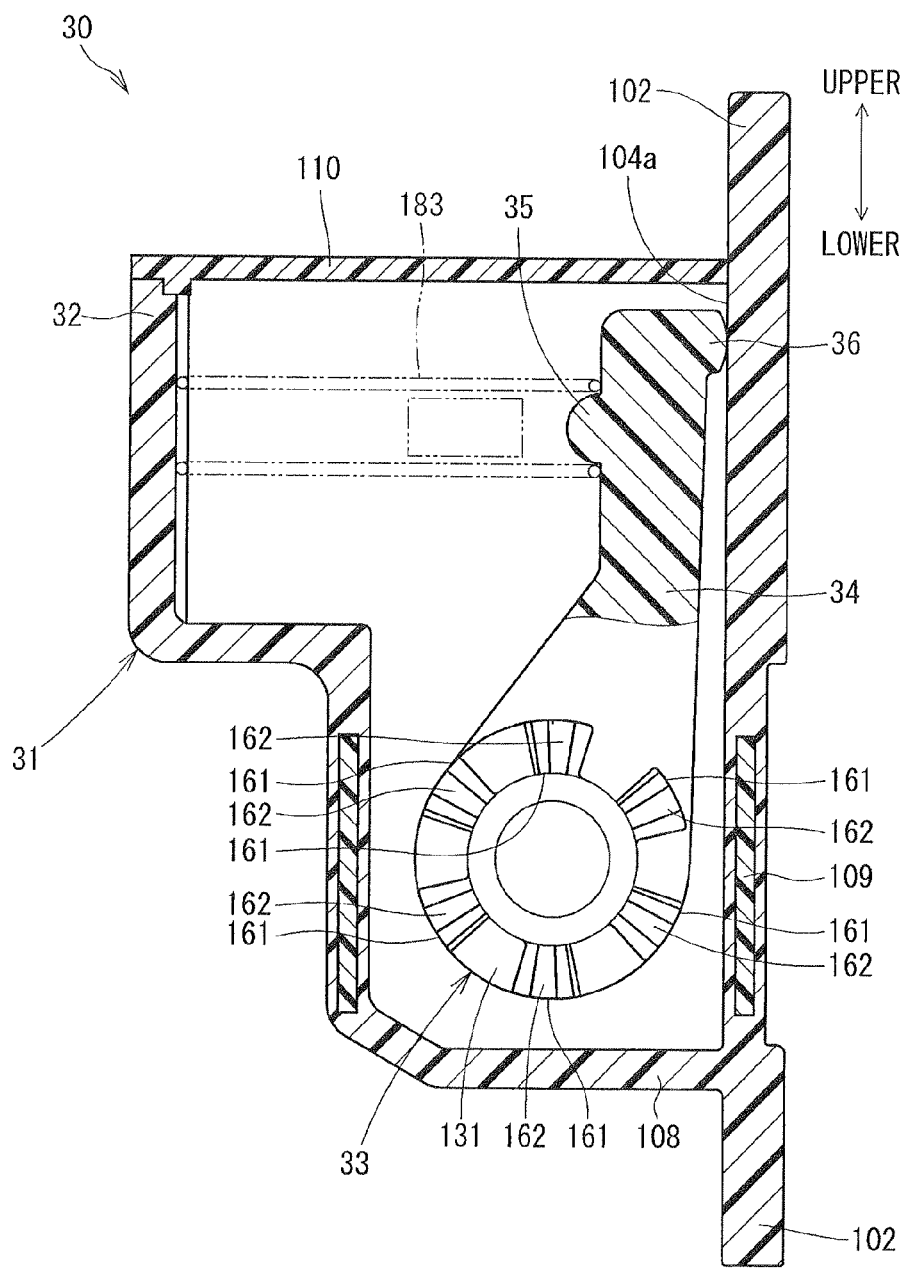
FIG. 13 is a sectional view taken along the line XIII-XIII in FIG. 12.
Figure 14:
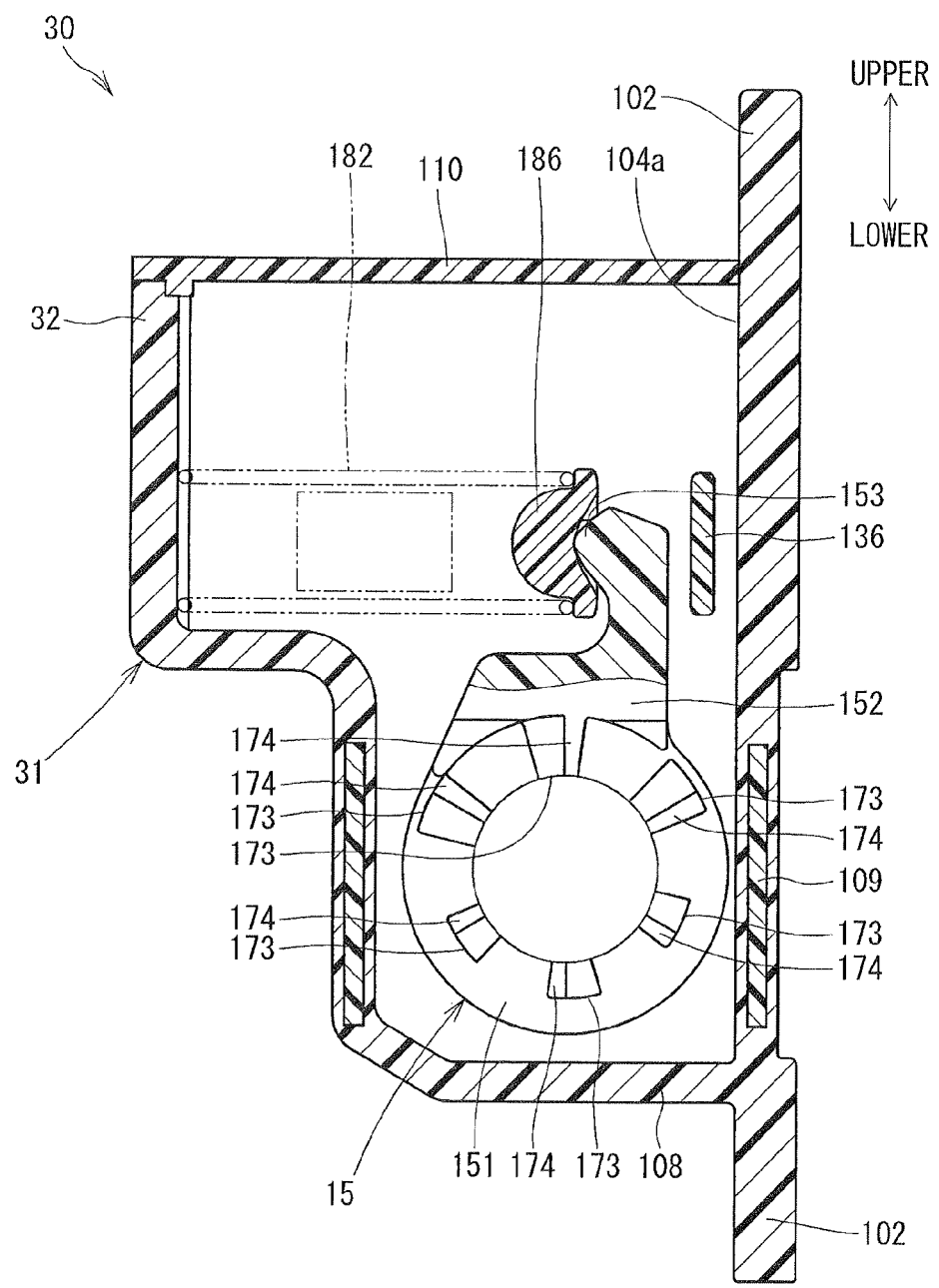
FIG. 14 is a sectional view taken along the line XIV-XIV in FIG. 12.

FIGS. 12 to 14 show an accelerator device of the second embodiment. In the second embodiment, the shapes of the housing portion and the pedal rotor differ from those of the first embodiment. Referring to FIGS. 12 to 14, in the second embodiment, the length of the upper portion of a housing portion 32 of a support member 31 in the upper-lower direction is greater than that of the housing portion 101 of the first embodiment.

The length of a pedal lever portion 34 of a pedal rotor 33 in the longitudinal direction is grater than the pedal lever portion 132 of the first embodiment. A full close stopper portion (stopper) 36 is formed in the tip end of the pedal lever portion 34. A pedal spring retaining portion 35 of the pedal rotor 33 is formed in an upper area in the pedal lever portion 34 than the first spring retaining portion 143 of the first rotor 14 and the second spring retaining portion 153 of the second rotor 15. An accelerator device 30 with the present configuration is configured to produce the same effect as that of the accelerator device 1 of the first embodiment.

Modification of Second Embodiment

Figure 15:
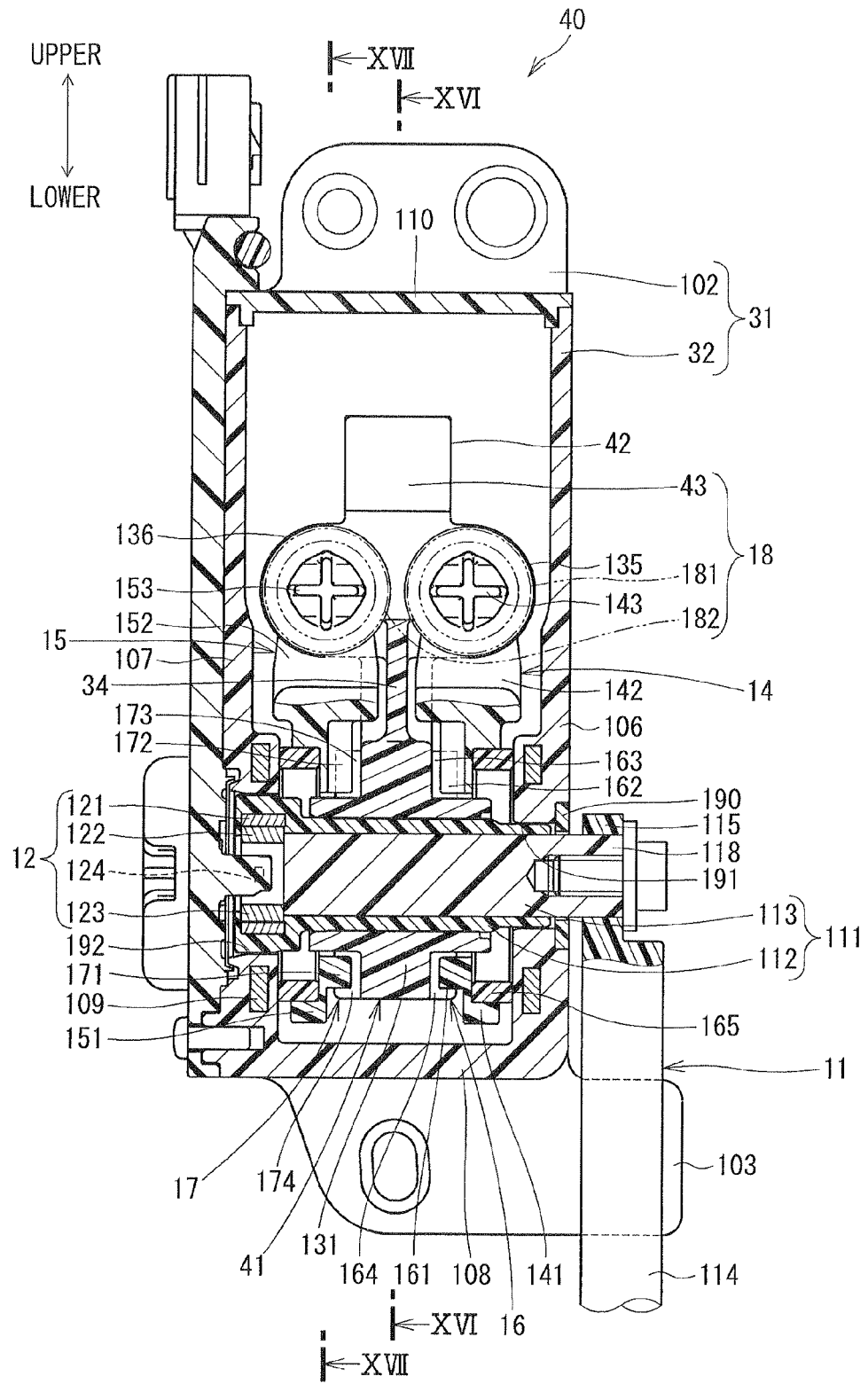
FIG. 15 is an overview showing an accelerator device according to a modification of the second embodiment of the present disclosure.
Figure 16:
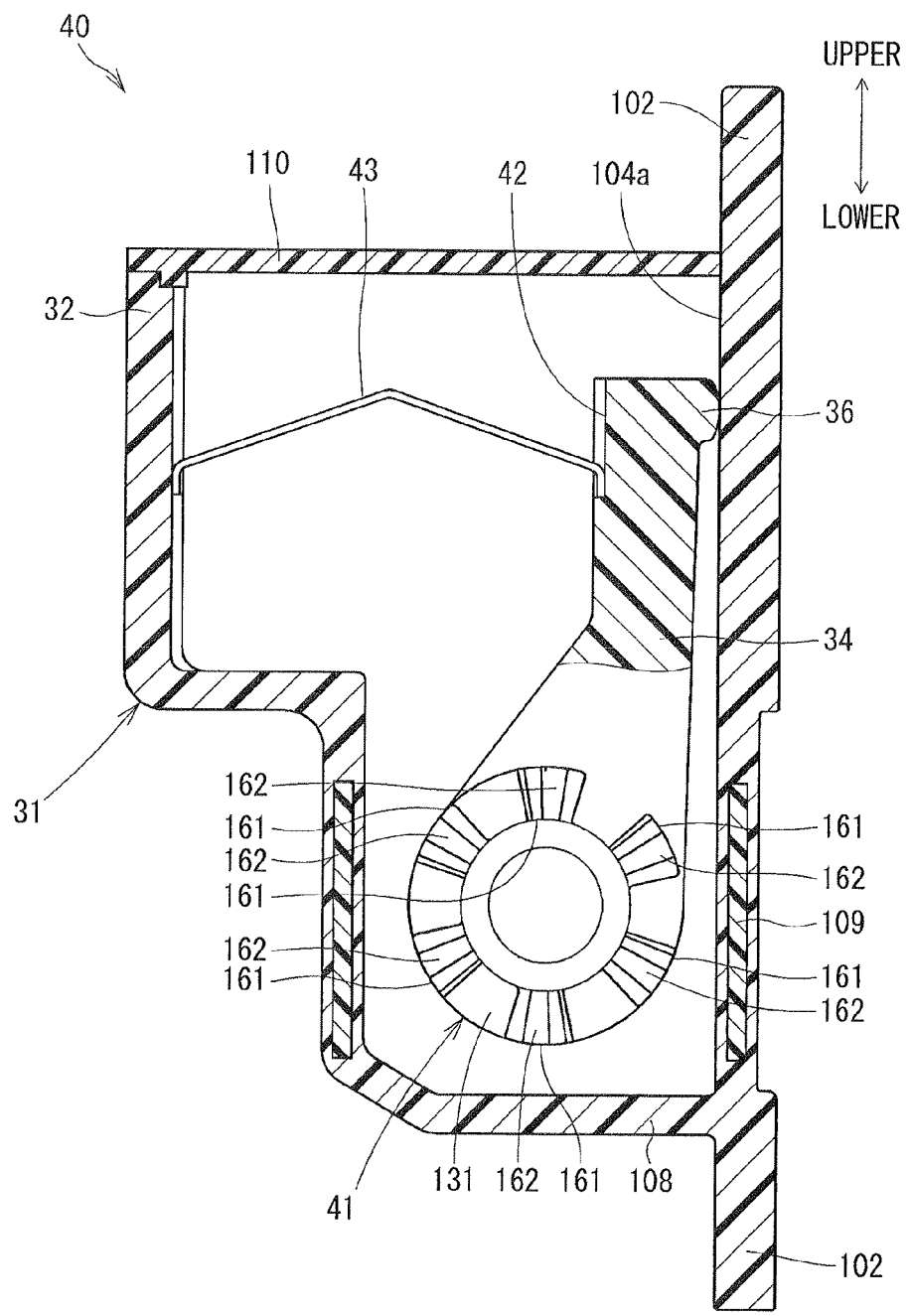
FIG. 16 is a sectional view taken along the line XVI-XVI in FIG. 15.
Figure 17:
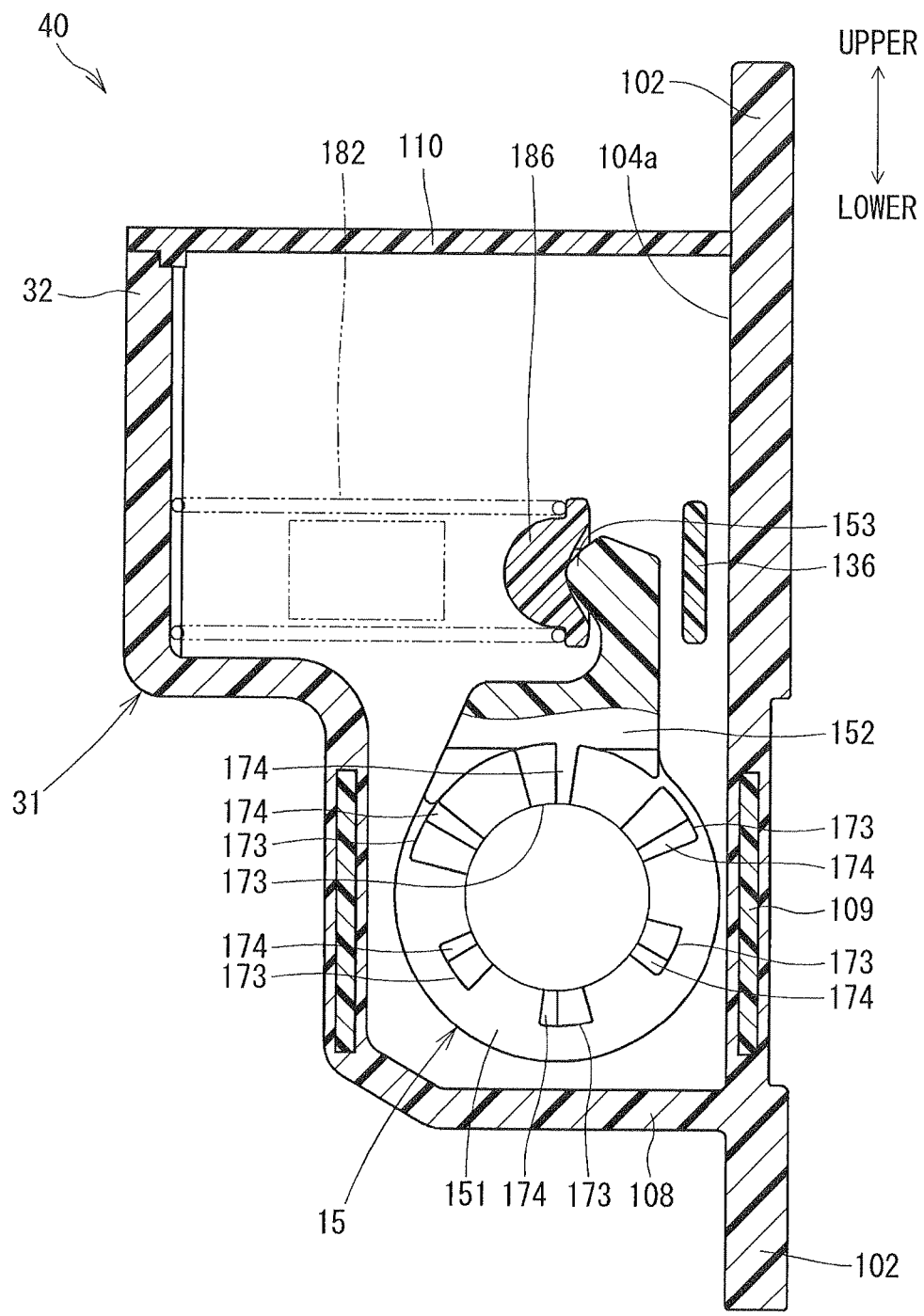
FIG. 17 is a sectional view taken along the line XVII-XVII in FIG. 15.

FIGS. 15 to 17 show an accelerator device of the modification of the second embodiment. In the present modification, the configurations of the pedal spring retaining portion of the pedal rotor and the third spring differ from those in the second embodiment. In the present modification, a third spring 43 of an accelerator device 40 is configured with a blade spring. A pedal spring retaining portion 42 of a pedal rotor 41 has a plane configured to receive one end of the third spring 43, which is configured with the blade spring. The operation of the third spring 43 is the same as the operation of the third spring 183 of the second embodiment. In the present modification of the second embodiment, configurations other than the above-described configuration are the same as those of the second embodiment. The accelerator device 40 with the present configuration is configured to produce the same effect as that of the accelerator device 30 of the second embodiment.

Third Embodiment

Figure 18:
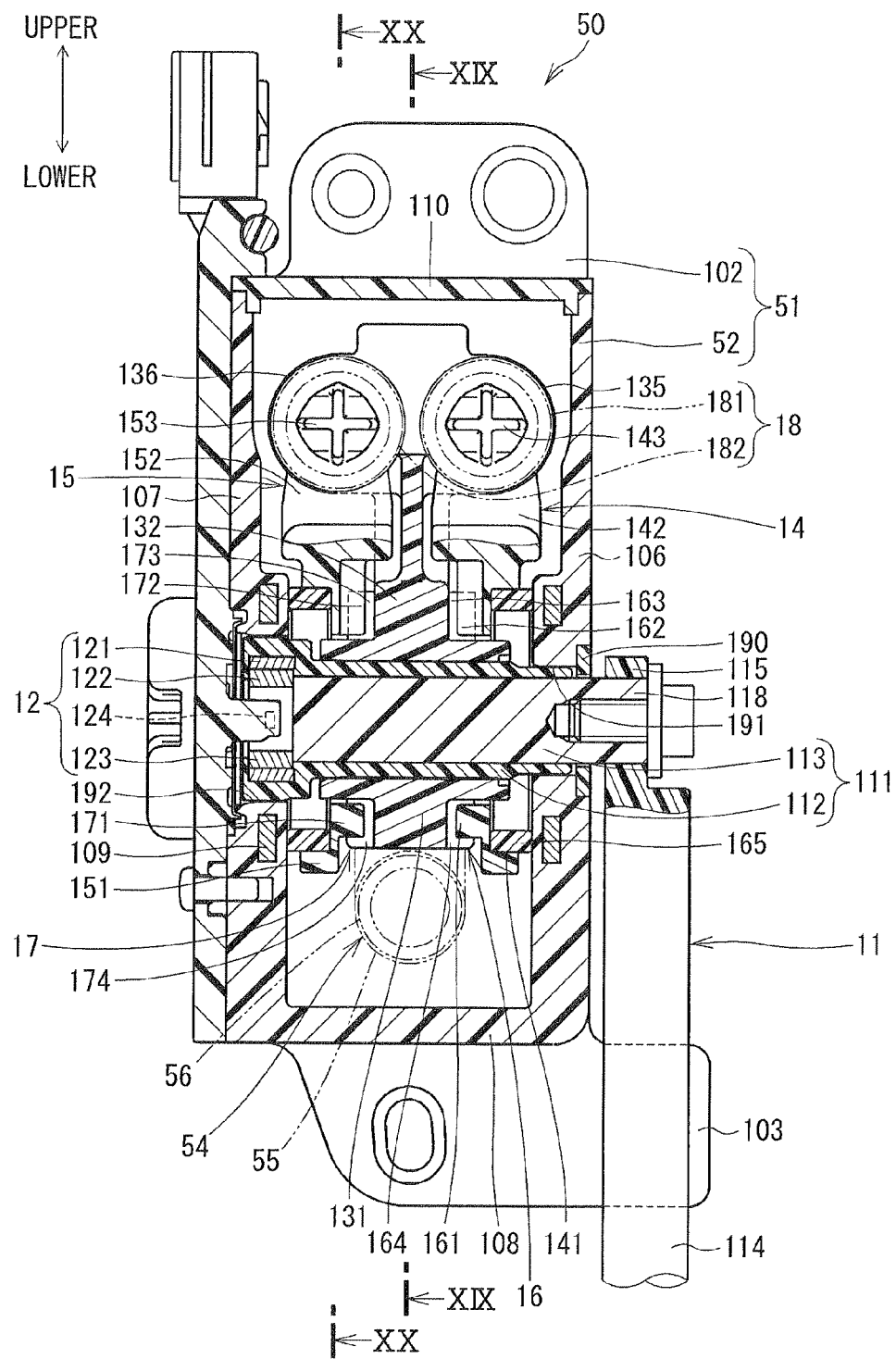
FIG. 18 is an overview showing an accelerator device according to a third embodiment of the present disclosure.
Figure 19:
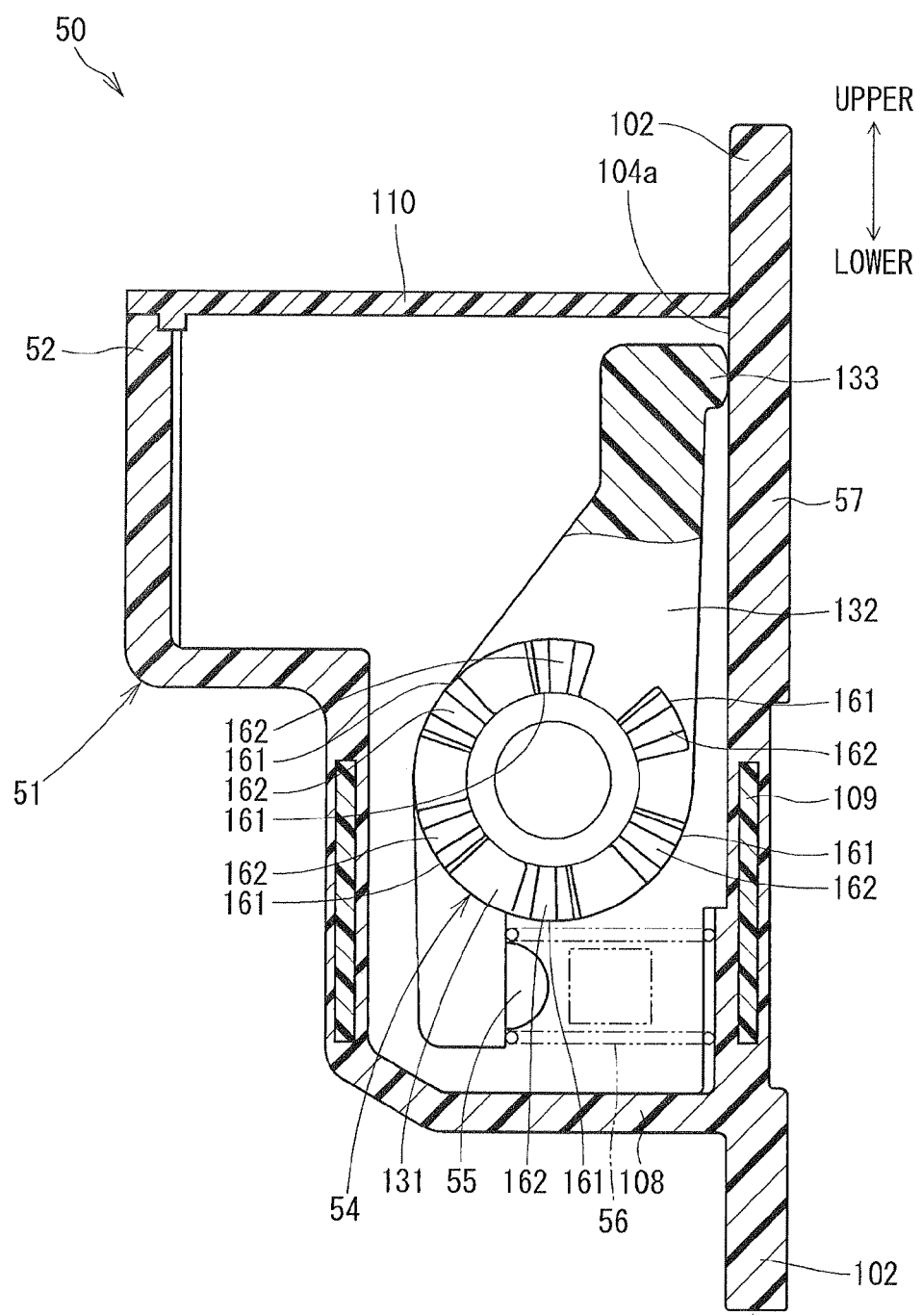
FIG. 19 is a sectional view taken along the line XIX-XIX in FIG. 18.
Figure 20:
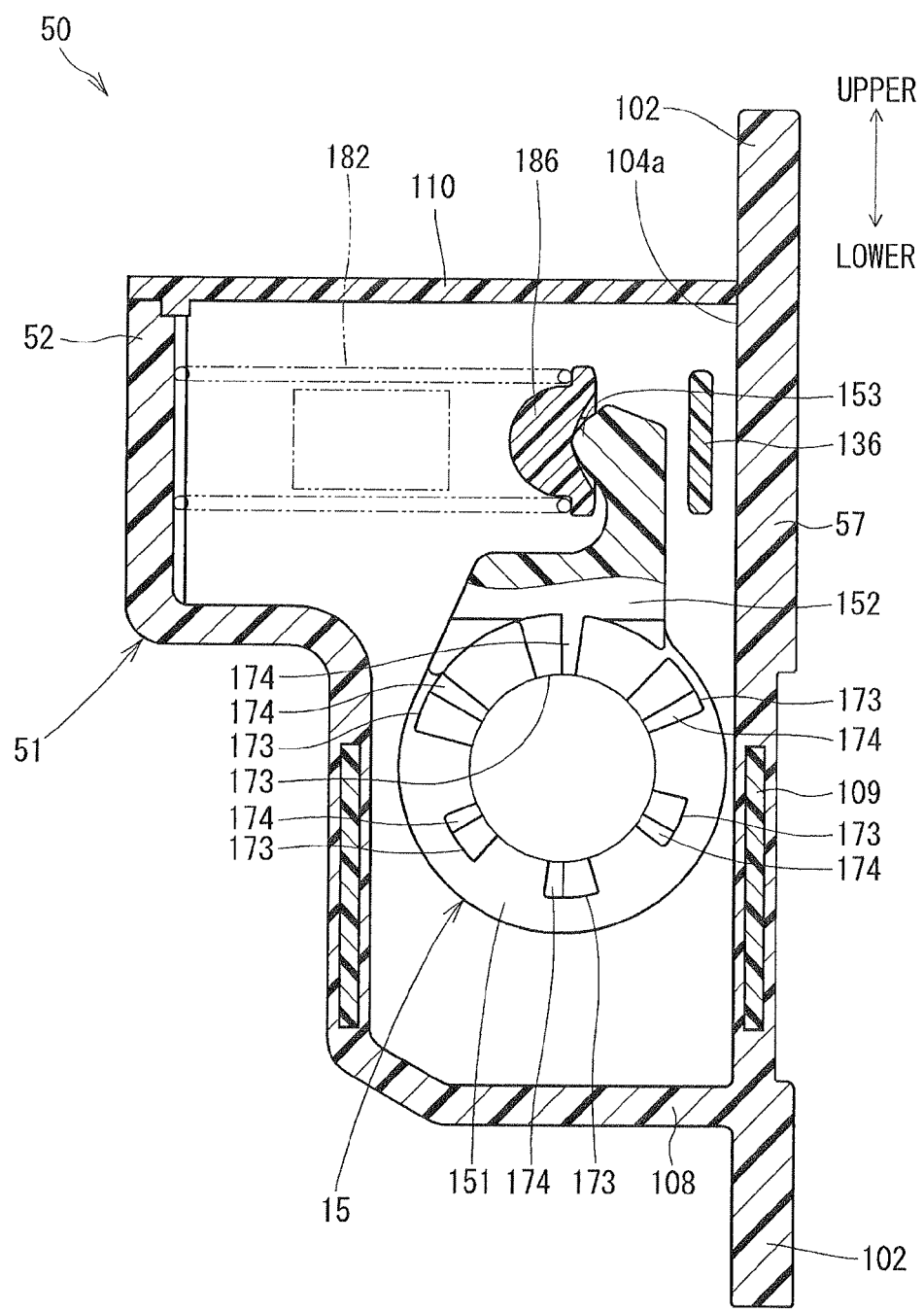
FIG. 20 is a sectional view taken along the line XX-XX in FIG. 18.

FIGS. 18 to 20 show an accelerator device of the third embodiment. In the third embodiment, the shapes of the housing portion and the pedal rotor differ from those of the first embodiment. Referring to FIGS. 18 to 20, in the third embodiment, the length of the lower portion of a housing portion 52 of the support member 31 in the upper-lower direction is greater than that of the housing portion 101 of the first embodiment.

A pedal spring retaining portion 55 of a pedal rotor 54 is projected in the opposite direction from the pedal lever portion 132 relative to the pedal boss portion 131. A third spring 56 is interposed between the pedal spring retaining portion 55 and a front portion 57 of the housing portion 52 to bias the pedal rotor 54 in the accelerator closing direction. As the rotation angle of the pedal rotor 54 increases relative to the accelerator full-close position, the biasing force working from the third spring 56 to the pedal rotor 54 increases. The biasing force is set to enable to return the accelerator pedal 11 and the pedal rotor 54 to the accelerator full-close position, irrespective of the rotational position of the accelerator pedal 11.

The biasing force of the third spring 56 is set be less than the summation of both the biasing force of the first spring 181 and the biasing force of the second spring 182. With the present configuration, the direction of the biasing force working on the shaft 111 does not change before and after depression of the accelerator pedal 11. Therefore, imperfect alignment of the accelerator pedal 11 can be restricted before and after the depression. An accelerator device 50 with the present configuration is configured to produce the same effect as that of the accelerator device 1 of the first embodiment.

Modification of Third Embodiment

Figure 21:
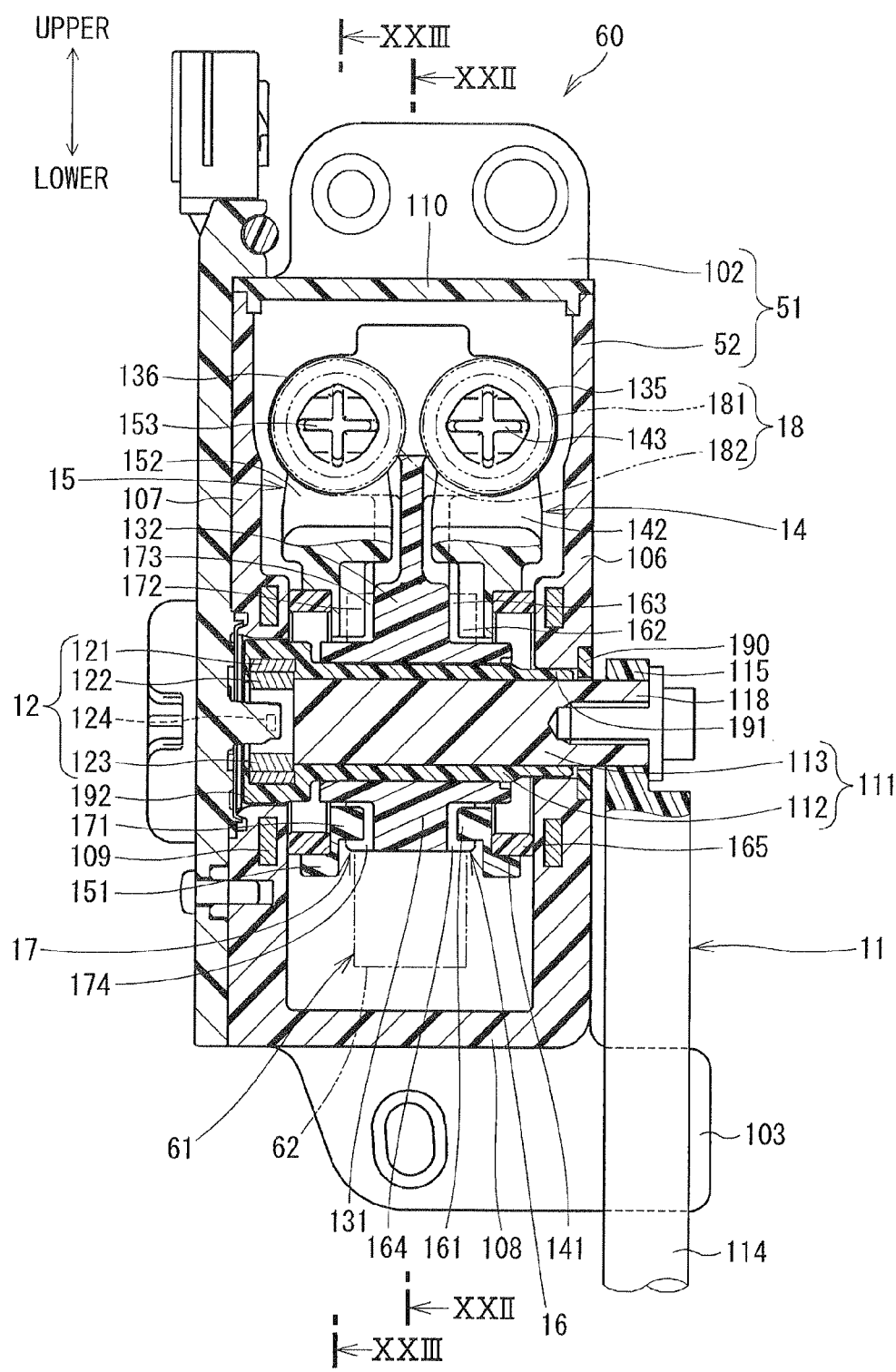
FIG. 21 is an overview showing an accelerator device according to a modification of the third embodiment of the present disclosure.
Figure 22:
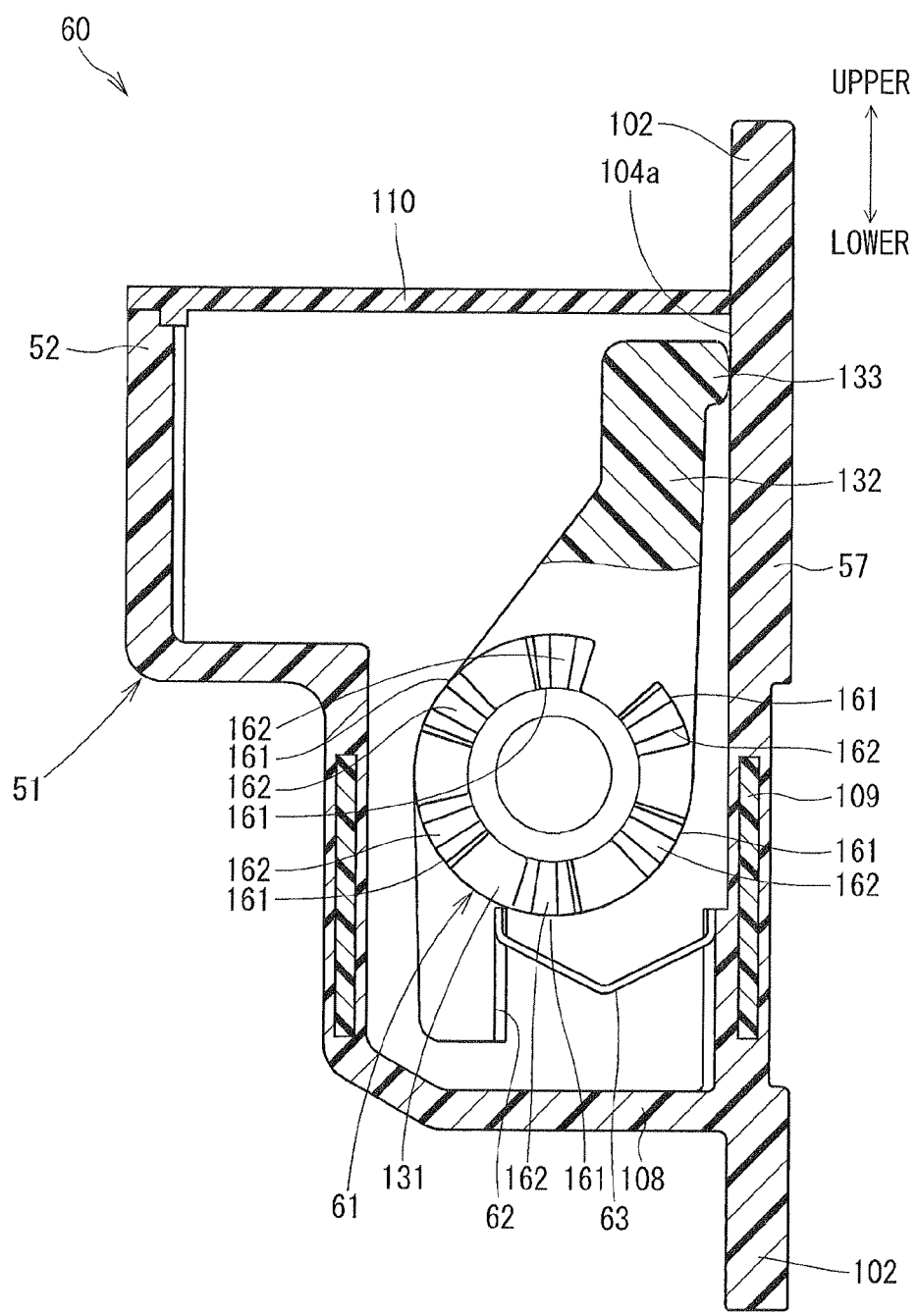
FIG. 22 is a sectional view taken along the line XXII-XXII in FIG. 21.
Figure 23:
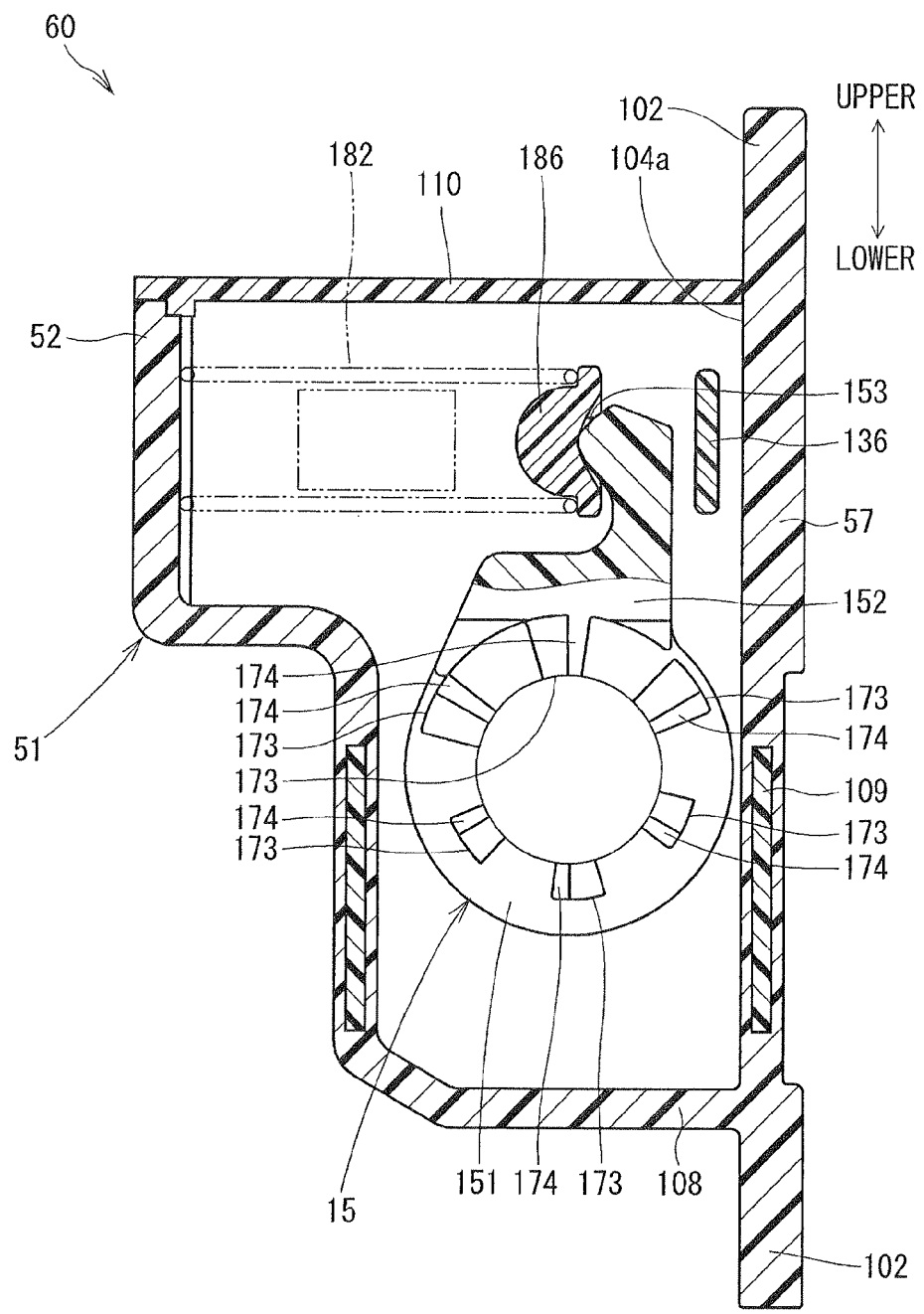
FIG. 23 is a sectional view taken along the line XXIII-XXIII in FIG. 21.

FIGS. 21 to 23 show an accelerator device of the modification of the third embodiment. In the present modification, the configurations of the pedal spring retaining portion of the pedal rotor and the third spring differ from those in the third embodiment. In the present modification, a third spring 63 of an accelerator device 60 is configured with a blade spring. A pedal spring retaining portion 62 of a pedal rotor 61 has a plane configured to receive one end of the third spring 63, which is configured with the blade spring. The operation of the third spring 63 is the same as the operation of the third spring 56 of the third embodiment. In the present modification of the third embodiment, configurations other than the above-described configuration are the same as those of the third embodiment. The accelerator device 60 with the present configuration is configured to produce the same effect as that of the accelerator device 50 of the third embodiment.

Fourth Embodiment

Figure 24:
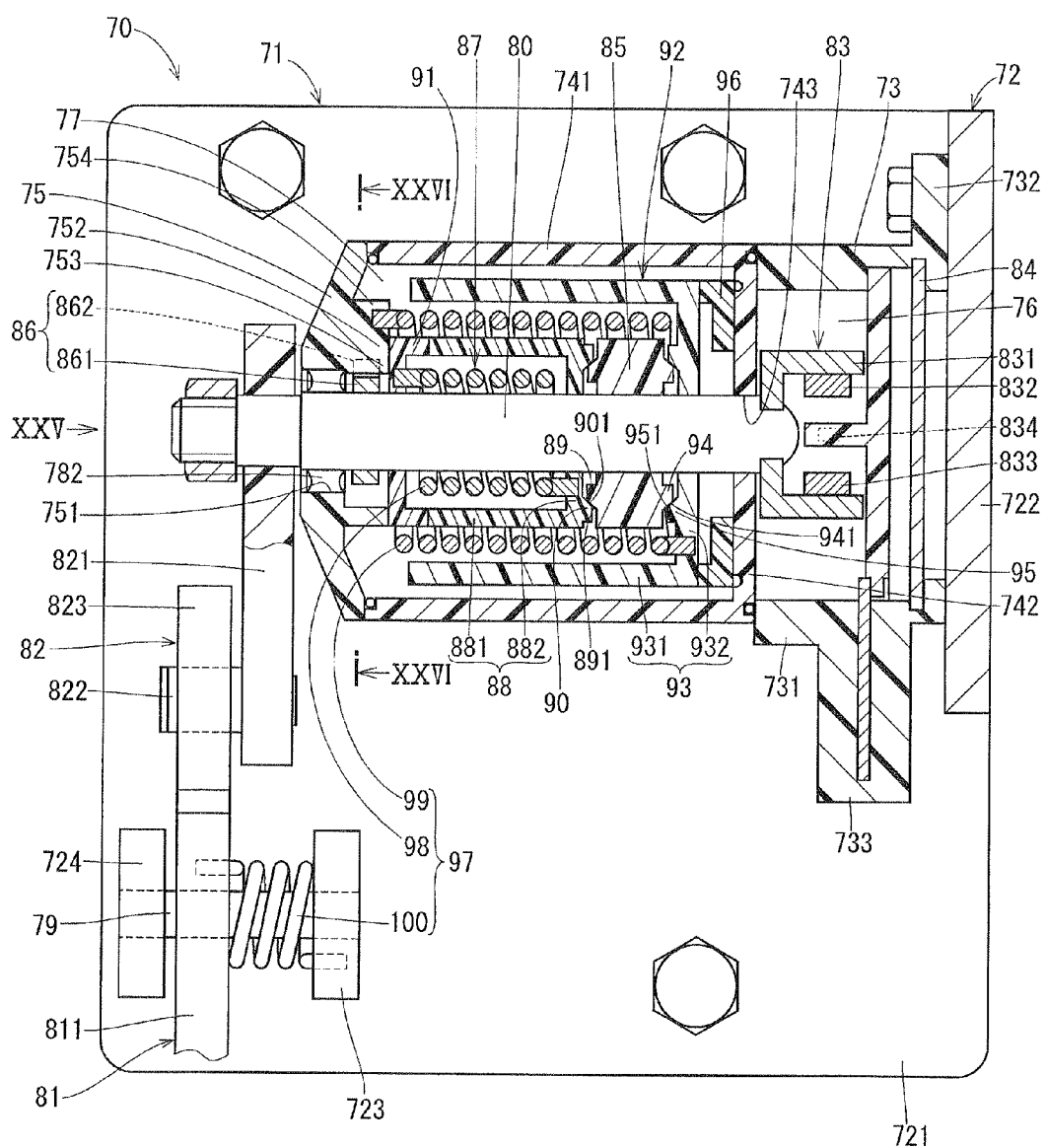
FIG. 24 is an overview showing an accelerator device according to a fourth embodiment of the present disclosure.
Figure 25:
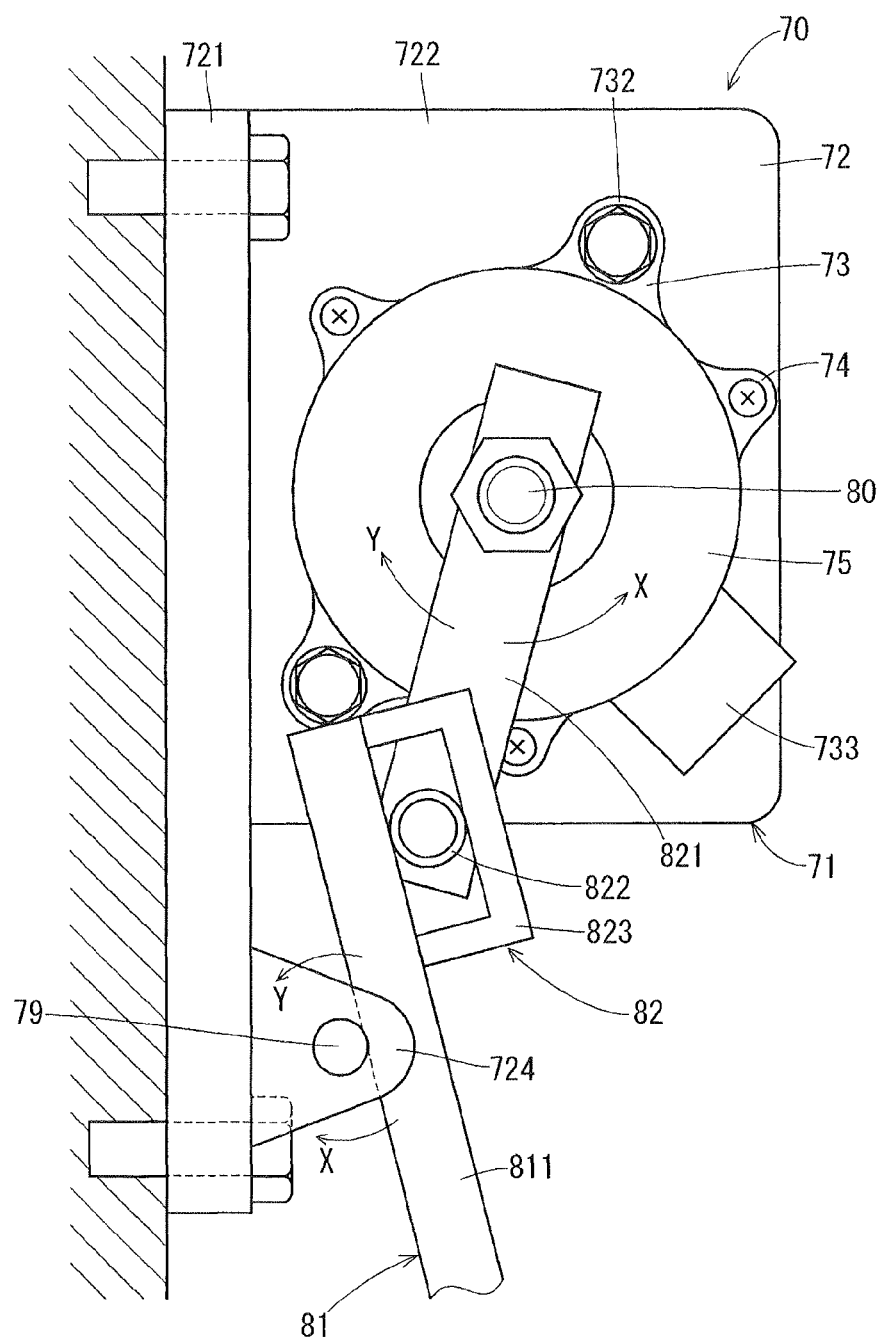
FIG. 25 is a view showing the accelerator device of FIG. 24 when being viewed along the arrow XXV.
Figure 26:
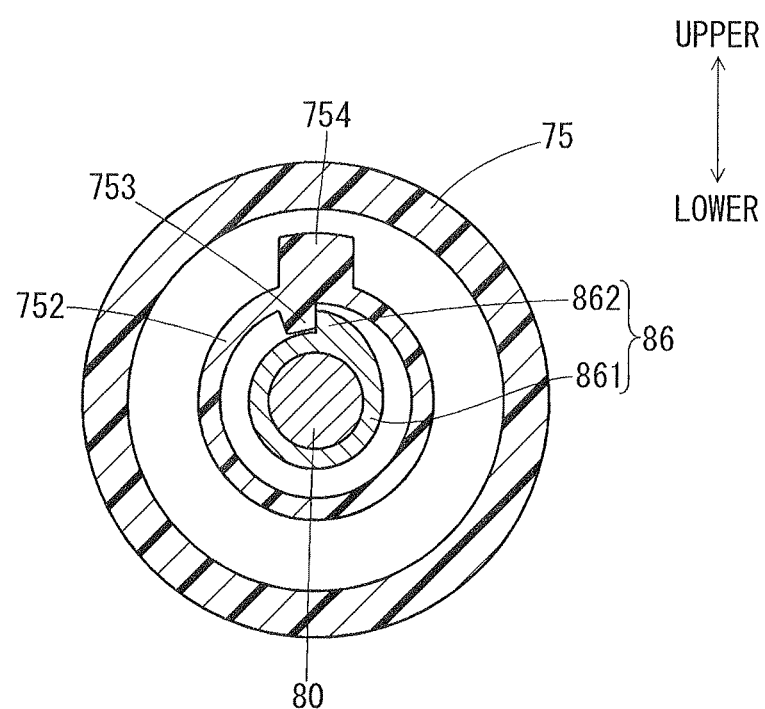
FIG. 26 is a sectional view taken along the line XXVI-XXVI in FIG. 24.

FIGS. 24 to 26 show an accelerator device of the fourth embodiment. An accelerator device 70 of the fourth embodiment includes a support member 71, a first shaft 79, a second shaft 80, an accelerator pedal 81, a rotary position sensor 83, a pedal rotor 85, a first tread force hysteresis mechanism 87, a second tread force hysteresis mechanism 92, and a biasing unit 97.

The support member 71 is configured with a base 72, a first case 73, a second case 74, and a cover 75. The base 72 includes a plate-shaped mounting portion 721, a plate-shaped mount part 722, and a pair of shaft support portions 723 and 724. The mounting portion 721 can be mounted to a structure such as an inner wall, which partitions the vehicle interior. The mount part 722 is integrally formed with the mounting portion 721. The pair of shaft support portions 723 and 724 is integrally formed with the mounting portion 721 to support the first shaft 79 rotatably. The first case 73 includes a tubular portion 731, multiple fixed portions 732, and a connector portion 733. The tubular portion 731 is extended in the thickness direction of the mount part 722. The multiple fixed portions 732 are integrally formed with the tubular portion 731 and are affixed to the mount part 722. The connector portion 733 is integrally formed with the tubular portion 731.

The second case 74 is in a cup shape and includes a tubular portion 741 and a bottom portion 742. The tubular portion 741 is located on the opposite side of the mount part 722 through the first case 73 and is coaxial with the tubular portion 731 of the first case 73. The tubular portion 741 is fixed to the tubular portion 731. The bottom portion 742 plugs the end of the tubular portion 741 on the side of the first case 73. The second case 74 is affixed to the first case 73 by, for example, a fastener such as a screw. The bottom portion 742 of the second case 74 has a through-hole 743 through which the second shaft 80 is inserted. The cover 75 is in a disc shape and plugs the end of the tubular portion 741 of the second case 74 on the opposite side from the bottom portion 742. The cover 75 has a through-hole 751 in which a bearing 782 is fitted. As shown in FIGS. 24 and 26, the cover 75 includes an annular fitted portion 752, a full close contact portion 753, and a retaining portion 754. The annular fitted portion 752 is engaged with a first friction member 91 such that the fitted portion 752 is not rotatable relative to the first friction member 91. The full close contact portion 753 is configured to make contact with a full close stopper 86. The retaining portion 754 retains an end of a second spring 99.

The mounting portion 721 of the base 72, the tubular portion 731 of the first case 73, and the bottom portion 742 of the second case 74 partition a first accommodation chamber 76 accommodating the rotary position sensor 83. The second case 74 and the cover 75 partition a second accommodation chamber 77 accommodating the first tread force hysteresis mechanism 87, the second tread force hysteresis mechanism 92, and the like. The second case 74 and the cover 75 are mounted to each other to function as a housing, which accommodates the full close stopper 86.

The first shaft 79 is rotatably supported by the pair of shaft support portions 723 and 724 of the support member 71. The second shaft 80 is axially in parallel with the first shaft 79 and is rotatably supported by the bearing 782 and the bottom portion 742 of the second case 74. One end of the second shaft 80 is extended on the opposite side from the second case 74 through the cover 75 to the outside of the second accommodation chamber 77. The accelerator pedal 81 includes a pedal rod 811 and a pedal pad (not shown). The pedal rod 811 is integrated with the first shaft 79. The pedal pad (not shown) is fixed to the lower end of the pedal rod 811. An operator depresses the pedal pad to operate the pedal rod 811. The accelerator pedal 81 is connected with one end of the second shaft 80 through a linkage mechanism 82 and is configured to transmit a torque to the second shaft 80. The accelerator pedal 81 is configured to rotate the second shaft 80 according to a depression quantity thereto.

The linkage mechanism 82 includes a lever 821, a roller 822, and a holding member 823. The lever 821 is connected to one end of the second shaft 80 at the outside of the second accommodation chamber 77. The roller 822 is located on the accelerator opening side relative to the upper end portion of the pedal rod 811. The roller 822 is projected from the tip end of the lever 821 toward the pedal rod 811. The holding member 823 is affixed to the upper end portion of the pedal rod 811 by, for example, welding. The holding member 823 supports the roller 822 with the pedal rod 811. The linkage mechanism 82 transmits a torque of the accelerator pedal 81 in the accelerator opening direction and a torque of the accelerator pedal 81 in the accelerator closing direction to the second shaft 80. The linkage mechanism 82 transmits a torque of the second shaft 80 in the accelerator closing direction to the accelerator pedal 81.

As shown by the arrow X in FIG. 25, the accelerator opening direction is the direction in which the accelerator pedal 81, the second shaft 80, and the like rotate when the accelerator pedal 81 is depressed. As shown by the arrow Y in FIG. 25, the accelerator closing direction is the direction in which the accelerator pedal 81, the second shaft 80, and the like rotate when the depression of the accelerator pedal 81 is released.

A rotary position sensor (rotation angle detection unit) 83 includes a yoke 831, a magnet 832, a magnet 833, a hall element 834, and the like. The yoke 831 is formed from a metallic material and is in a tubular shape concentric with the second shaft 80. The yoke 831 is integrated with the second shaft 80. The magnets 832 and 833 are located in the yoke 831, such that the magnets 832 and 833 oppose to each other through the axial center of the second shaft 80. The magnets 832 and 833 are fixed to the inner wall of the yoke 831. The magnets 832 and 833 are arranged such that inner magnetic poles of the magnets 832 and 833 are opposed to each other and are different from each other. The hall element 834 is located between the magnets 832 and 833 and is mounted on a substrate 835 fixed to the first case 73.

A metallic cover 84 is equipped on the opposite side from the hall element 834 though the substrate 835. The cover 84 has a function to restrain decrease in detection accuracy of the rotary position sensor 83 due to a disturbance. The operation of the rotary position sensor 83 is the same as that of the rotary position sensor 12 of the first embodiment. The rotary position sensor 83 detects the relative rotation angle of the second shaft 80 to the support member 71 by utilizing the Hall effect. The rotary position sensor 83 further sends an electric signal representing the detected relative rotation angle to an electronic control unit.

The pedal rotor 85 is in an annular shape and is fitted to the second shaft 80 at the position between the bottom portion 742 of the second case 74 and the cover 75. The pedal rotor 85 is integrated with the second shaft 80. The full close stopper (stopper) 86 is accommodated in the second accommodation chamber 77. The full close stopper 86 includes an annular portion 861 and a protrusion 862. The annular portion 861 is fixed to the second shaft 80. The protrusion 862 is projected from the annular portion 861 toward an upper area in the second accommodation chamber 77. The protrusion 862 regulates rotation of the second shaft 80 in the accelerator closing direction when making contact with the full close contact portion 753 of the cover 75. The protrusion 862 is configured to make contact with a vertical wall of the full close contact portion 753. The rotational position of the second shaft 80 when the protrusion 862 of the full close stopper 86 is in contact with the full close contact portion 753 of the cover 75 is set as the accelerator full-close position in control.

When the accelerator pedal 81 rotates in the accelerator opening direction, the rotation angle of the accelerator pedal 81 increases in the accelerator opening direction relative to the accelerator full close position, and the accelerator position increases correspondingly to the rotation angle. When the accelerator pedal 81 rotates in the accelerator closing direction, the rotation angle of the accelerator pedal 81 decreases in the accelerator opening direction relative to the accelerator full close position, and the accelerator position decreases correspondingly to the rotation angle.

The first tread force hysteresis mechanism 87 includes a first rotor 88, a first helical tooth 89, a second helical tooth 90, and the first friction member 91. The first rotor 88 is in a cup shape and includes a tubular portion 881 and a bottom portion 882. The tubular portion 881 is located between the pedal rotor 85 and the cover 75 and located outside the second shaft 80. The bottom portion 882 plugs the end of the tubular portion 881 on the side of the pedal rotor 85. The first rotor 88 is rotatable relative to the second shaft 80 and the pedal rotor 85. The first rotor 88 is configured to approach the first friction member 91 and to move away from the first friction member 91.

The first helical tooth 89 is integrally formed with the wall of the pedal rotor 85 opposed to the first rotor 88, such that the first helical tooth 89 is further projected from the pedal rotor 85 toward the first rotor 88 on the accelerator closing side. Multiple first helical teeth 89 are arranged in the circumferential direction at regular intervals. According to the fourth embodiment, for example, six pieces of the first helical teeth 89 are formed. The first helical tooth 89 has a first engagement slope 891, which approaches the first rotor 88 on the accelerator closing side.

The second helical tooth 90 is integrally formed with the wall of the first rotor 88 opposed to the pedal rotor 85, such that the second helical tooth 90 is further projected from the first rotor 88 toward the pedal rotor 85 on the accelerator opening side. Multiple second helical teeth 90 are arranged in the circumferential direction at regular intervals. According to the fourth embodiment, for example, six pieces of the second helical teeth 90 are formed. The second helical tooth 90 has a first engaged slope 901, which approaches the pedal rotor 85 on the accelerator opening side. When the pedal rotor 85 rotates in the accelerator opening direction, the first engaged slope 901 is configured to engage with the first engagement slope 891 of the first helical tooth 89.

The second helical tooth 90 is formed such that the pedal rotor 85 is rotatable to the accelerator full close position when the pedal rotor 85 rotates in the accelerator closing direction, without causing interference with the first helical tooth 89, irrespective of the rotational position of the first rotor 88. Specifically, the angle between a pair of the second helical teeth 90, which are adjacent to each other in the circumferential direction, is set to be greater than the rotation angle of the pedal rotor 85 from the accelerator full-close position to the accelerator full-open position. That is, the clearance formed between the first helical tooth 89 and the second helical tooth 90 in the circumferential direction allows rotation of the pedal rotor 85 from the accelerator full-close position to the accelerator full-open position.

When the pedal rotor 85 rotates in the accelerator opening direction, the first helical tooth 89 and the second helical tooth 90 are in contact with and are engaged with each other at the first engagement slope 891 and the first engaged slope 901. The first engaged slope 901 slides relative to the first engagement slope 891, as the rotation angle of the pedal rotor 85 increases, such that the first rotor 88 is spaced from the pedal rotor 85. In this way, as the rotation angle of the pedal rotor 85 increases, the second helical tooth 90 applies greater force to the first rotor 88 to bias the first rotor 88 toward the cover 75.

The first friction member 91 is in an annular shape and is located between the tubular portion 881 of the first rotor 88 and the cover 75. The first friction member 91 is, for example, not rotatable relative to the cover 75. When the first rotor 88 is biased by the second helical tooth 90 toward the cover 75, the first friction member 91 is pressed between the first rotor 88 and the cover 75 and is frictionally engaged with the first rotor 88. The first friction member 91 and the first rotor 88 generate a frictional force therebetween at this time to cause a rotational resistance of the first rotor 88. The rotational resistance is transmitted to the pedal rotor 85, which is engaged with the first rotor 88, the second shaft 80, which is movable in conjunction with the pedal rotor 85, and the accelerator pedal 81. The first friction member 91 applies a frictional resistance torque to the first rotor 88. The frictional resistance torque increases, as the pressing force from the second helical tooth 90 to the first rotor 88 toward the cover 75 becomes greater.

The second tread force hysteresis mechanism 92 includes a second rotor 93, a first helical tooth 94, a second helical tooth 95, and a second friction member 96. The second rotor 93 is in a cup shape and includes a tubular portion 931 and a bottom portion 932. The tubular portion 931 is located outside the pedal rotor 85 and the first rotor 88. The bottom portion 932 is located between the pedal rotor 85 and the bottom portion 742 of the second case 74. The bottom portion 932 plugs the end of the tubular portion 931 on the side of the bottom portion 742. The second rotor 93 is rotatable relative to the second shaft 80 and the pedal rotor 85. The second rotor 93 is configured to approach the second friction member 96 and to move away from the second friction member 96.

The first helical tooth 94 is integrally formed with the wall of the pedal rotor 85 opposed to the second rotor 93, such that the first helical tooth 94 is further projected from the pedal rotor 85 toward the second rotor 93 on the accelerator closing side. Multiple first helical teeth 94 are arranged in the circumferential direction at regular intervals. According to the fourth embodiment, for example, six pieces of the first helical teeth 94 are formed. The first helical tooth 94 has a first engagement slope 941, which approaches the second rotor 93 on the accelerator closing side.

The second helical tooth 95 is integrally formed with the wall of the second rotor 93 opposed to the pedal rotor 85, such that the second helical tooth 95 is further projected from the second rotor 93 toward the pedal rotor 85 on the accelerator opening side. Multiple second helical teeth 95 are arranged in the circumferential direction at regular intervals. According to the fourth embodiment, for example, six pieces of the second helical teeth 95 are formed. The second helical tooth 95 has a first engaged slope 951, which approaches the pedal rotor 85 on the accelerator opening side. When the pedal rotor 85 rotates in the accelerator open direction, the first engaged slope 951 is configured to engage with the first engagement slope 941 of the first helical tooth 94.

The second helical tooth 95 is formed such that the pedal rotor 85 is rotatable to the accelerator full close position when the pedal rotor 85 rotates in the accelerator closing direction, without causing interference with the first helical tooth 94, irrespective of the rotational position of the second rotor 93. Specifically, the angle between a pair of the second helical teeth 95, which are adjacent to each other in the circumferential direction, is set to be greater than the rotation angle of the pedal rotor 85 from the accelerator full-close position to the accelerator full-open position. That is, the clearance formed between the first helical tooth 94 and the second helical tooth 95 in the circumferential direction allows rotation of the pedal rotor 85 from the accelerator full-close position to the accelerator full-open position.

When the pedal rotor 85 rotates in the accelerator opening direction, the first helical tooth 94 and the second helical tooth 95 are in contact with and are engaged with each other at the first engagement slope 941 and the first engaged slope 951. The first engaged slope 951 slides relative to the first engagement slope 941, as the rotation angle of the pedal rotor 85 increases, such that the second rotor 93 is spaced from the pedal rotor 85. In this way, as the rotation angle of the pedal rotor 85 increases, the second helical tooth 95 applies greater force to the second rotor 93 to bias the second rotor 93 toward the bottom portion 932 of the second case 74.

The second friction member 96 is in an annular shape and is located between the tubular portion 931 of the second rotor 93 and the bottom portion 932 of the second case 74. The second friction member 96 is, for example, not rotatable relative to the second case 74. When the second rotor 93 is biased by the second helical tooth 95 toward the bottom portion 932 of the second case 74, the second friction member 96 is pressed between the second rotor 93 and the second case 74 and is frictionally engaged with the second rotor 93. The second friction member 96 and the second rotor 93 generate a frictional force therebetween at this time to cause a rotational resistance of the second rotor 93. The rotational resistance is transmitted to the pedal rotor 85, which is engaged with the second rotor 93, the second shaft 80, which is movable in conjunction with the pedal rotor 85, and the accelerator pedal 81. The second friction member 96 applies a frictional resistance torque to the second rotor 93. The frictional resistance torque increases, as the pressing force from the second helical tooth 95 to the second rotor 93 toward the second case 74 becomes greater.

The biasing unit 97 includes a first spring 98 and the second spring 99, which function as a first biasing unit, and a third spring 100, which functions as a second biasing unit. The first spring 98 is a torsion spring located outside the second shaft 80 and located inside the tubular portion 881 of the first rotor 88. One end of the first spring 98 is retained by the bottom portion 882 of the first rotor 88. The other end of the first spring 98 is retained by the first friction member 91. The first spring 98 biases the first rotor 88 in the accelerator closing direction. As the rotation angle of the first rotor 88 increases, the biasing force working from the first spring 98 to the first rotor 88 increases. The biasing force working from the first spring 98 to the first rotor 88 is applied to the pedal rotor 85 through the first helical tooth 89 and the second helical tooth 90.

The second spring 99 is a torsion spring located outside the first rotor 88 and the pedal rotor 85 and located inside the tubular portion 931 of the second rotor 93. One end of the second spring 99 is retained by the bottom portion 932 of the second rotor 93. The other end of the second spring 99 is retained by the cover 75. The second spring 99 biases the second rotor 93 in the accelerator closing direction. As the rotation angle of the second rotor 93 increases, the biasing force working from the second spring 99 to the second rotor 93 increases. The biasing force working from the second spring 99 to the second rotor 93 is applied to the pedal rotor 85 through the first helical tooth 94 and the second helical tooth 95.

The third spring 100 is a torsion spring located between the pedal rod 811 of the accelerator pedal 81 and the shaft support portion 723 of the support member 71. The third spring 100 is located outside the first shaft 79. One end of the third spring 100 is retained by the pedal rod 811, and the other end of the third spring 100 is retained by the shaft support portion 723. The third spring 100 biases the accelerator pedal 81 in the accelerator closing direction. As the rotation angle of the accelerator pedal 81 increases, the biasing force working from the third spring 100 to the accelerator pedal 81 increases. The biasing force of the third spring 100 is set such that the accelerator pedal 81 and the second shaft 80, which is in conjunction with the accelerator pedal 81, can be returned to the accelerator full-close position, irrespective of the rotational position of the accelerator pedal 81.

As follows, the operation of the accelerator device 70 will be described.

When the accelerator pedal 81 is depressed, the second shaft 80 rotates in the accelerator opening direction according to the tread force applied to the accelerator pedal 81. In order to maintain the depression of the accelerator pedal 81, it suffices to apply the tread force to generate a torque greater than the difference between the torque, which is caused by the biasing force of the first spring 98, the biasing force of the second spring 99, and the biasing force of the third spring 100, and the frictional resistance torque, which is caused by the frictional force of the first friction member 91 and the frictional force of the second friction member 96. The frictional resistance torque caused by the frictional force of the first friction member 91 and the frictional force of the second friction member 96 works to restrict the pedal rotor 85 and the second shaft 80 from rotating in the accelerator closing direction when depression of the accelerator pedal 81 is maintained. The accelerator device 70 has the tread force characteristic shown in FIG. 6 similarly to the accelerator device 1 of the first embodiment.

Herein, it is assumed a case where the first rotor 88 and the second rotor 93 are unable to rotate relative to each other. The situation may occur when, for example, foreign matter sticks between the first rotor 88 and the first friction member 91 or between the second rotor 93 and the second friction member 96. Alternatively, the situation may occur when, for example, a frictional force between the first friction member 91 and the second friction member 96 increases due to environmental variation and/or the like. In such a case, the biasing force of the first spring 98 and the biasing force of the second spring 99 do not work on the pedal rotor 85. Even in such a condition, the biasing force of the third spring 100 works on the pedal rotor 85.

As described above, in the accelerator device 70 of the fourth embodiment, the frictional resistance torque applied to the first rotor 88 and the second rotor 93 works to maintain the accelerator position corresponding to the rotation angle of the pedal rotor 85 when the depression of the accelerator pedal 81 is released. The present configuration reduces the tread force when the depression of the accelerator pedal 81 is maintained at a desired position, when depression of the accelerator pedal 81 is gradually reduced, and/or the like. Therefore, burden of the operator can be reduced.

Furthermore, the biasing unit 97 of the accelerator device 70 includes the third spring 100, which biases the accelerator pedal 81 in the accelerator closing direction, in addition to the first spring 98 and the second spring 99, which bias the first rotor 88 and the second rotor 93 in the accelerator closing direction. The pedal rotor 85 is configured to rotate in the accelerator closing direction to the accelerator full-close position, irrespective of the rotational position of the first rotor 88 and the second rotor 93 and without causing interference with the first rotor 88 and the second rotor 93. Specifically, the angle between a pair of the second helical teeth 90, which are adjacent to each other in the circumferential direction, is set to be greater than the rotation angle of the pedal rotor 85 from the accelerator full-close position to the accelerator full-open position. In addition, the angle between a pair of the second helical teeth 95, which are adjacent to each other in the circumferential direction, is set to be greater than the rotation angle of the pedal rotor 85 from the accelerator full-close position to the accelerator full-open position.

It is conceivable that the frictional force of the first friction member 91 and the second friction member 96 may increase due to environmental variation and/or the like. In this case, the frictional resistance torque working on the first rotor 88 and the second rotor 93 may increase consequently. Alternatively, it is conceivable that foreign matter sticks between the first friction member 91 and the first rotor 88 or between the second friction member 96 and the second rotor 93. In this case, the first rotor 88 may adhere to the second rotor 93 consequently. As a result, the biasing force of the first spring 98 and the second spring 99 may not work on the pedal rotor 85. Even in such conditions, the third spring 100 applies the biasing force to the accelerator pedal 81 to return the accelerator pedal 81 to the accelerator full-close position, according to the present configuration. With the present configuration, when depression of the accelerator pedal 81 is released, the accelerator pedal 81 is enabled to return to the accelerator full-close position, irrespective of the rotary positions of the first rotor 88 and the second rotor 93.

In addition, according to the fourth embodiment, even when two of the first spring 98, the second spring 99, and the third spring 100 are broken, the remaining one functions to return the accelerator pedal 81 and the second shaft 80 to the accelerator full-close position. In addition, according to the fourth embodiment, the third spring 100 generates the biasing force to return the accelerator pedal 81 and functional members, such as the second shaft 80, which are in conjunction with the accelerator pedal 81, to the accelerator full-close position. Therefore, even in a condition where the biasing force of the first spring 98 and the second spring 99 does not work on the pedal rotor 85 at all, the accelerator pedal 81 can be steadily returned to the accelerator full-close position.

In addition, according to the fourth embodiment, the full close stopper 86 is accommodated in the second accommodation chamber 77 of the support member 71. Therefore, it is possible to restrain foreign matter from sticking between the full close stopper 86 and the full close contact portion 753 of the cover 75. In addition, according to the fourth embodiment, the accelerator pedal 81 is offset relative to the pedal rotor 85 in the axial direction of the second shaft 80. In addition, the accelerator pedal 81 is connected to one end of the second shaft 80 through the linkage mechanism 82 outside the second accommodation chamber 77. In the present configuration, the cover 75 and the second case 74 do not have an opening. Therefore, it is possible to restrict foreign matter from intruding into the second accommodation chamber 77, which accommodates the pedal rotor 85 and the like, irrespective of the rotational position of the accelerator pedal 81. Therefore, it is possible further to restrain foreign matter from sticking between the full close stopper 86 and the full close contact portion 753 of the cover 75.

In addition, according to the fourth embodiment, the full close stopper 86 is accommodated in the upper area of the second accommodation chamber 77. When the first friction member 91 and the second friction member 96 cause ablation powder, such ablation powder accumulates on the lower side of the second accommodation chamber 77. Therefore, such ablation powder can be restricted from sticking between the full close stopper 86 and the full close contact portion 753 of the cover 75, which are located in the upper area of the second accommodation chamber 77. Further, according to the fourth embodiment, the full close stopper 86 makes contact with the vertical wall of the full close contact portion 753 of the cover 75. Therefore, even when foreign matter, such as ablation powder, moves upward to an upper area of the second accommodation chamber 77, such foreign matter falls down to a lower area in the second accommodation chamber 77, without adhering to the full close contact portion 753. Therefore, it is possible further to restrain foreign matter, such as ablation power, from sticking between the full close stopper 86 and the full close contact portion 753 of the cover 75.

Other Embodiment

According to the other embodiment of the present disclosure, a dead band, in which depression of the pedal is not detected, may be set in a range from a rotational position, in which the full close stopper is in contact with the support member, to a rotational position, in which the accelerator pedal is rotated by a predetermined angle in the accelerator opening direction. In this case, the rotational position, at which the accelerator pedal is rotated from the rotational position, at which the full close stopper is in contact with the support member, by a predetermined angle in the accelerator opening direction may be set as the accelerator full-close position in its control.

In addition, according to the other embodiment of the present disclosure, a friction member may not be provided between the first rotor and the support member and/or between the second rotor and the support member. In this case, the first rotor may frictionally engage directly with the support member, and/or the second rotor may frictionally engage directly with the support member.

In addition, according to the other embodiment of the present disclosure, the first biasing unit and the second biasing unit may be configured with a biasing component other than a coil spring, a blade spring, and/or a torsion spring.

In addition, according to the other embodiment of the present disclosure, the second biasing unit may be configured with multiple biasing members.

In addition, according to the other embodiment of the present disclosure, the second biasing unit may bias the first shaft, the second shaft, or a component of a linkage mechanism, which connects the accelerator pedal with the second shaft, in the accelerator closing direction.

In addition, according to the other embodiment of the present disclosure, the rotary position sensor need not include a magnet and a hall element. The rotary position sensor may employ another generally-known configuration configured to detect the rotational position of the shaft.

In addition, according to the other embodiment of the present disclosure, another generally-known linkage mechanism may be employed in place of the linkage mechanism 82 of the fourth embodiment.

As described above, the present disclosure is not limited to the above-described embodiments and is practicable in various forms within the gist.

The above-described accelerator device is equipped with the support member, the first shaft, the accelerator pedal, the rotation angle detection unit, the pedal rotor, the rotors, the first helical tooth, the second helical tooth, the first biasing unit, and the second biasing unit. The support member is attachable to the vehicle body. The first shaft is rotatably supported by the support member. The accelerator pedal is integrated with the first shaft and is configured to rotate the first shaft according to its depression quantity. The rotation angle detection unit is configured to detect the relative rotation angle of the first shaft to the support member. The pedal rotor is integrated with the first shaft. The rotors are equipped to both sides of the accelerator pedal in the axial direction. Both the rotors are relatively rotatable to the pedal rotor. The pedal rotor is integrally formed with the first helical tooth projected toward each of both the rotors, as being on a side in the accelerator closing direction.

Both the rotors are integrally formed with the second helical tooth projected toward the pedal rotor, as being on a side in the accelerator opening direction. The second helical tooth is configured to engage with the first helical tooth and to bias the rotors toward the support member when the pedal rotor rotates in the accelerator opening direction. The second helical tooth is formed such that the pedal rotor is rotatable to the accelerator full-close position without interfering with the first helical tooth, when the pedal rotor rotates in the accelerator closing direction. The first biasing unit biases both the rotors in the accelerator closing direction. The second biasing unit is configured to bias the accelerator pedal, the first shaft, or the pedal rotor in the accelerator closing direction.

In the accelerator device with the present configuration, both the rotors are biased toward the support member frictionally to engage with the support member directly or indirectly to receive resisting torque. The resisting torque is transmitted to the pedal rotor through the second helical tooth and the first helical tooth. The resisting torque transmitted to the pedal rotor works to maintain the accelerator position corresponding to the rotation angle of the accelerator pedal when depression of the accelerator pedal is released. The present configuration reduces the tread force when the depression of the accelerator pedal is maintained at a desired position, when depression of the accelerator pedal is gradually reduced, and/or the like. Therefore, burden of an operator when manipulating the accelerator pedal can be reduced.

It is conceivable that the frictional force between the rotor and the support member increases due to environmental variation and/or the like to increase the resisting torque working on the rotor. Alternatively, it is also conceivable that foreign matter sticks between the rotor and the support member to cause both the rotors to adhere to each other. Consequently, in such situations, the biasing force of the first biasing unit does not work on the accelerator pedal. Nevertheless, with the present configuration, the biasing force of the second biasing unit is enabled to work on the accelerator pedal. In this case, the pedal rotor is rotatable to the accelerator full-close position without interfering with the second helical tooth or the like, irrespective of the rotation stop positions of both the rotors. In this way, the accelerator pedal is enabled to return to the accelerator full-close position, irrespective of the rotational positions of the rotors, when depression of the accelerator pedal is released.

The first biasing unit may include the first spring and the second spring. In this case, the first spring is configured to bias one of both the rotors, and the second spring is configured to bias the other of both the rotors. With the present configuration, even when two of the first spring, the second spring, and the second biasing unit are broken, the remaining one functions to return the accelerator pedal to the accelerator full-close position.

The rotor may form the spring retaining portion extended outward in the radial direction and biased with the first biasing unit. In this case, the accelerator pedal may form the spring receiving portion located in the accelerator closing direction relative to the spring retaining portion of the rotor. In the present configuration, for example, when the second biasing unit does not function and when the spring retaining portion of the rotor is broken, the biasing force of the first biasing unit works on the accelerator pedal through the spring retaining portion of the rotor, which is broken. Therefore, when the second biasing unit does not function and when the spring retaining portion of the rotor is broken, the accelerator pedal can be returned to the accelerator full-close position.

The pedal rotor may form the boss, the lever, and the stopper. In this case, the boss may be fitted to the outer wall of the first shaft. Further, in this case, the lever may be extended from the boss outward in the radial direction. The stopper may be integrally formed with the lever and may be configured to make contact with the support member thereby to regulate rotation of the first shaft in the accelerator closing direction. The support member may include the housing portion accommodating the stopper. In the present configuration, the stopper is equipped in the housing portion of the support member. Therefore, it is possible, to restrict foreign matter from sticking between the stopper and the inner wall of the support member.

One end of the first shaft may extend to the outside of the housing portion of the support member. In this case, the accelerator pedal may be connected with the one end of the first shaft at the outside of the housing portion of the support member. In the present configuration, the gap formed between the first shaft and the through hole of the housing portion does not change when the first shaft rotates. Therefore, the gap can be made small as much as possible. Thus, it is possible to restrict foreign matter outside the housing portion from intruding into the housing portion of the support member, which accommodates the stopper and the like, irrespective of the rotational position of the accelerator pedal. Thus, it is further possible to restrict foreign matter from sticking between the stopper and the inner wall of the support member.

The stopper may be located in the upper area in the housing portion of the support member. In this case, the stopper may oppose to the inner wall, which is substantially vertical and is formed by the housing portion of the support member. For example, when ablation powder is caused, such ablation powder accumulates in the lower area inside the housing portion. In the present configuration, it is possible to restrain such ablation powder from sticking between the stopper and the inner wall of the housing portion located in the upper area inside the housing portion. In addition, even when such ablation powder moves upward in the housing portion, such ablation powder subsequently moves downward in the housing portion without accumulating on the inner wall of the housing portion to which the stopper makes contact. Thus, it is possible to restrict such ablation power from sticking between the stopper and the inner wall of the support member.

The lever may extend to the opposite side from the accelerator pedal relative to the first shaft. In this case, the second biasing unit may be further configured to bias the intermediate portion of the lever located between the stopper and the first shaft. In the present configuration, in both cases where the accelerator pedal is not depressed and the accelerator pedal is depressed, the first shaft is biased toward the same side of the inner wall surface of the through hole of the housing portion of the support member. That is, the direction of the biasing force working on the first shaft does not change before and after the depression of the accelerator pedal. Therefore, it is possible to restrict the first shaft from causing imperfect alignment and from swinging within the fitting hole of the housing portion before and after the depression of the accelerator pedal. Thus, it is possible to restrict reduction in the detection accuracy of the rotation angle of the first shaft due to the imperfect alignment.

Conventionally, it is concerned that the support member may be deformed and further spaced away from the rotors due to the pressing force from the rotors toward the support member. It is further concerned that the relation (tread force characteristic) between the tread force and the rotation angle of the accelerator pedal may vary due to the deformation of the support member. In consideration of this, the support member may be molded from resin to include the receiving portion, which is configured to receive the pressing force toward the support member of the rotor, and the receiving portion may be embedded with the metallic reinforcement member. According to the present configuration, it is possible to restrict the support member from deforming due to the pressing force from the rotor, with the light-weight structure. Therefore, it is possible to restrain variation in the tread force characteristic of the accelerator pedal due to deformation of the support member.

The accelerator device may be equipped with the support member, the first shaft, the second shaft, the accelerator pedal, the rotation angle detection unit, the pedal rotor, the rotors, the first helical tooth, the second helical tooth, the first biasing unit, and the second biasing unit. The support member may be attachable to the vehicle body. The first shaft may be rotatably supported by the support member. The second shaft may be axially in parallel with the first shaft and rotatably supported by the support member. The accelerator pedal may be integrated with the first shaft and may be connected with the second shaft such that the second shaft is rotatable according to the depression quantity. The rotation angle detection unit may be configured to detect the relative rotation angle of the second shaft to the support member. The pedal rotor may be integrated with the second shaft. The rotors may be equipped to both sides of the pedal rotor in the axial direction. Both the rotors may be relatively rotatable to the pedal rotor. The first helical tooth may be integrated with the pedal rotor to project toward both the rotors, as being on the side in the accelerator closing direction.

Both the rotors may be integrally formed with the second helical tooth projected toward the pedal rotor, as being on the side in the accelerator opening direction. The second helical tooth may be configured to engage with the first helical tooth and to bias both the rotors toward the support member when the pedal rotor rotates in the accelerator opening direction. The second helical tooth may be formed such that the pedal rotor is rotatable to the accelerator full-close position without interfering with the first helical tooth, when the pedal rotor rotates in the accelerator closing direction. The first biasing unit may bias both the rotors in the accelerator closing direction. The second biasing unit may be configured to bias the accelerator pedal, the first shaft, the second shaft, or the pedal rotor in the accelerator closing direction.

In the accelerator device with the present configuration, both the rotors are biased toward the support member frictionally to engage with the support member directly or indirectly to receive resisting torque. The resisting torque is transmitted to the pedal rotor through the second helical tooth and the first helical tooth. The resisting torque transmitted to the pedal rotor works to maintain the accelerator position corresponding to the rotation angle of the accelerator pedal when depression of the accelerator pedal is released. The present configuration reduces the tread force when the depression of the accelerator pedal is maintained at a desired position, when depression of the accelerator pedal is gradually reduced, and/or the like. Therefore, burden of an operator when manipulating the accelerator pedal can be reduced.

It is conceivable that the frictional force between the rotor and the support member increases due to environmental variation and/or the like to increase the resisting torque working on the rotor. Alternatively, it is also conceivable that foreign matter sticks between the rotor and the support member to cause both the rotors to adhere to each other. Consequently, in such situations, the biasing force of the first biasing unit does not work on the accelerator pedal. Nevertheless, with the present configuration, the biasing force of the second biasing unit is enabled to work on the accelerator pedal. In this case, the pedal rotor is rotatable to the accelerator full-close position without interfering with the second helical tooth or the like, irrespective of the rotational positions of both the rotors. In this way, the accelerator pedal is enabled to return to the accelerator full-close position, irrespective of the rotational positions of the rotors, when depression of the accelerator pedal is released.

The first biasing unit may include the first spring and the second spring. In this case, the first spring is configured to bias one of both the rotors, and the second spring is configured to bias the other of both the rotors. With the present configuration, even when two of the first spring, the second spring, and the second biasing unit are broken, the remaining one functions to return the accelerator pedal to the accelerator full-close position.

The accelerator device may further include the stopper integrated with the second shaft and configured to make contact with the support member thereby to regulate rotation of the second shaft in the accelerator closing direction. In this case, the stopper may be accommodated in the housing portion of the support member. With the present configuration, it is possible to restrict such ablation power from sticking between the stopper and the inner wall of the support member.

One end of the second shaft may extend to the outside of the housing portion of the support member. The accelerator pedal may be connected with the one end of the second shaft at the outside of the housing of the support member through a linkage mechanism to enable torque transmission. In the present configuration, the gap formed between the second shaft and the through hole of the housing portion does not change when the second shaft rotates. Therefore, the gap can be made small as much as possible. Thus, it is possible to restrict foreign matter outside the housing portion from intruding into the housing portion of the support member, which accommodates the stopper and the like, irrespective of the rotational position of the accelerator pedal. Thus, it is further possible to restrict foreign matter from sticking between the stopper and the inner wall of the support member.

The stopper may be located at an upper area in the housing portion of the support member and may be configured to make contact with the inner wall being substantially vertical and formed by the housing portion of the support member when regulating rotation of the second shaft in the accelerator closing direction. For example, when ablation powder is caused, such ablation powder accumulates in the lower area inside the housing portion. In the present configuration, it is possible to restrain such ablation powder from sticking between the stopper and the inner wall of the housing portion located in the upper area inside the housing portion. In addition, even when such ablation powder moves upward in the housing portion, such ablation powder subsequently moves downward in the housing portion without accumulating on the inner wall of the housing portion to which the stopper makes contact. Thus, it is possible to restrict such ablation power from sticking between the stopper and the inner wall of the support member.

In the present disclosure, the accelerator full-close position is the rotational position of the accelerator pedal where the accelerator device or the electronic control unit determines that the operator does not depress the accelerator pedal. The accelerator full-close position may be the rotational position, in which the accelerator pedal is in contact with the stopper, or the rotational position, in which the accelerator pedal is rotated from the position, in which the accelerator pedal is in contact with the stopper, in the accelerator opening direction by a predetermined angle. That is, the accelerator full-close position is the full-close position in its control.

The above configurations of the embodiments can be combined as appropriate. It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An accelerator device comprising:
a support member configured to be affixed to a vehicle body;
a first shaft rotatably supported by the support member;
an accelerator pedal integrated with the first shaft and configured to rotate the first shaft according to a quantity of depression on the accelerator pedal;
a rotation angle detection unit configured to detect a relative rotation angle of the first shaft to the support member;
a pedal rotor integrated with the first shaft;
rotors equipped to both sides of the pedal rotor in an axial direction, respectively, and relatively rotatable to the pedal rotor;
first helical teeth integrated with the pedal rotor to project toward both the rotors, respectively, as being on a side in an accelerator closing direction;
second helical teeth integrated with the rotors, respectively, to project toward the pedal rotor, as being on a side in an accelerator opening direction, the second helical teeth being configured to engage with the first helical teeth and to bias both the rotors toward the support member when the pedal rotor rotates in the accelerator opening direction, the second helical teeth being formed to enable the pedal rotor to rotate to the accelerator full-close position without interfering with the first helical teeth when the pedal rotor rotates in the accelerator closing direction;
a first biasing unit configured to bias both the rotors in the accelerator closing direction; and
a second biasing unit configured to bias at least one of the accelerator pedal, the first shaft, and the pedal rotor in the accelerator closing direction.

2. The accelerator device according to claim 1, wherein the first biasing unit includes a first spring and a second spring, the first spring being configured to bias one of the rotors, the second spring being configured to bias an other of the rotors.

3. The accelerator device according to claim 1, wherein at least one of the rotors has a spring retaining portion extended outward in a radial direction and configured to be biased with the first biasing unit, and the pedal rotor has a spring receiving portion located on a side in an accelerator closing direction relative to the spring retaining portion of the at least one of the rotors.

4. The accelerator device according to claim 1, wherein the pedal rotor includes:
a boss fitted to an outer wall of the first shaft;
a lever extended from the boss outward in a radial direction; and
a stopper integrally formed with the lever and configured to make contact with the support member thereby to regulate rotation of the first shaft in the accelerator closing direction, and the support member includes a housing portion accommodating the stopper.

5. The accelerator device according to claim 4, wherein one end of the first shaft extends to an outside of the housing portion of the support member, and the accelerator pedal is connected to the one end of the first shaft at the outside of the housing portion of the support member.

6. The accelerator device according to claim 4, wherein the stopper is located in an upper area inside the housing portion of the support member and is opposed to an inner wall of the housing portion of the support member, the inner wall being substantially vertical.

7. The accelerator device according to claim 4, wherein the lever extends to an opposite side from the accelerator pedal relative to the first shaft, and the second biasing unit is further configured to bias an intermediate portion of the lever between the stopper and the first shaft.

8. The accelerator device according to claim 4, wherein the support member is molded from resin to include a receiving portion, which is configured to receive a pressing force toward the support member of the rotor rotors that are equipped to both sides of the pedal rotor in the axial direction, and the receiving portion is embedded with a metallic reinforcement member.

9. The accelerator device according to claim 1, wherein the accelerator closing direction is substantially perpendicular to the axis of the first shaft.

* * * * *